(12) United States Patent
Kozhevnikov et al.

(10) Patent No.: US 7,965,227 B2
(45) Date of Patent: Jun. 21, 2011

(54) AIRCRAFT TRACKING USING LOW COST TAGGING AS A DISCRIMINATOR

(75) Inventors: Vadim Kozhevnikov, Vienna, VA (US); Carl Evers, Vienna, VA (US)

(73) Assignee: ERA Systems, Inc., Fairfax, VA (US)

( * ) Notice: Subject to any disclaimer, the term of this patent is extended or adjusted under 35 U.S.C. 154(b) by 242 days.

(21) Appl. No.: 12/390,487

(22) Filed: Feb. 22, 2009

(65) Prior Publication Data

US 2009/0201191 A1  Aug. 13, 2009

Related U.S. Application Data (63) Continuation-in-part of application No. 11/541,480, filed on Sep. 29, 2006, now Pat. No. 7,570,214, which is a continuation-in-part of application No. 11/429,926, filed on May 8, 2006, now Pat. No. 7,477,193.

(51) Int. Cl.
*G01S 13/08* (2006.01)
*G01S 13/00* (2006.01)

(52) U.S. Cl. .......................................... 342/145; 342/32

(58) Field of Classification Search .................. 342/32, 342/145, 454, 456, 465; 701/120, 207
See application file for complete search history.

(56) References Cited

U.S. PATENT DOCUMENTS

| | | | |
|---|---|---|---|
| 1,738,571 A | 12/1929 | Gare | 404/18 |
| 3,668,403 A | 6/1972 | Meilander | 701/121 |
| 3,705,404 A | 12/1972 | Chisholm | 343/112 R |
| 3,792,472 A | 2/1974 | Payne et al. | 342/32 |
| 4,079,414 A | 3/1978 | Sullivan | 725/114 |
| 4,115,771 A | 9/1978 | Litchford | 343/6 R |
| 4,122,522 A | 10/1978 | Smith | 701/15 |
| 4,167,006 A | 9/1979 | Funatsu et al. | 343/6.5 LC |
| 4,196,474 A | 4/1980 | Buchanan et al. | 364/461 |
| 4,224,669 A | 9/1980 | Brame | 701/8 |
| 4,229,737 A | 10/1980 | Heldwein et al. | 343/6 R |
| 4,293,857 A | 10/1981 | Baldwin | 343/6.5 |
| 4,315,609 A | 2/1982 | McLean et al. | |
| 4,327,437 A | 4/1982 | Frosch et al. | 714/3 |
| 4,359,733 A | 11/1982 | O'Neill | 342/36 |
| 4,454,510 A | 6/1984 | Crow | 343/5 |

(Continued)

FOREIGN PATENT DOCUMENTS

DE     4306660 A1     8/1974

(Continued)

OTHER PUBLICATIONS

Traffic Alert System Technical Design Summary, Final Report, Apr. 1994 (Baldwin et al.).

(Continued)

*Primary Examiner* — Dao L Phan
(74) *Attorney, Agent, or Firm* — Robert Platt Bell (57) ABSTRACT

A simplified multilateration and ADS-B Surveillance System is used, to perform tagging for the FAA Low Cost Ground Surveillance program. This system may also be used as the foundation for a full multilateration system, if a customer wants to upgrade. The present invention uses just one active transmitter/receiver unit as opposed to multiple passive receivers. The present invention captures UF 5 and DF 5 data, thus providing Mode A identification, which then acts as the key to obtaining the call sign from a data fusion packages— thus making it an affordable and marketable product for small to medium-sized airports.

20 Claims, 2 Drawing Sheets

U.S. PATENT DOCUMENTS

| | | | |
|---|---|---|---|
| 4,524,931 A | 6/1985 | Nilsson | 246/167 |
| 4,646,244 A | 2/1987 | Bateman | 701/301 |
| 4,688,046 A | 8/1987 | Schwab | 342/456 |
| 4,782,450 A | 11/1988 | Flax | 364/461 |
| 4,811,308 A | 3/1989 | Michel | 367/136 |
| 4,843,397 A | 6/1989 | Galati et al. | 342/59 |
| 4,853,700 A | 8/1989 | Funatsu et al. | 342/30 |
| 4,897,661 A | 1/1990 | Hiraiwa | 342/457 |
| 4,899,296 A | 2/1990 | Khattak | 702/40 |
| 4,910,526 A | 3/1990 | Donnangelo et al. | 342/455 |
| 4,914,733 A | 4/1990 | Gralnick | 340/961 |
| 4,958,306 A | 9/1990 | Powell et al. | 702/40 |
| 5,001,490 A | 3/1991 | Fichtner | 342/195 |
| 5,001,650 A | 3/1991 | Francis et al. | 364/516 |
| 5,017,930 A | 5/1991 | Stoltz | 342/465 |
| 5,025,382 A | 6/1991 | Artz | 364/439 |
| 5,027,114 A | 6/1991 | Kawashima et al. | 340/941 |
| 5,045,861 A | 9/1991 | Duffett-Smith | 342/457 |
| 5,075,680 A | 12/1991 | Dabbs | 342/52 |
| 5,075,694 A | 12/1991 | Donnangelo et al. | 342/455 |
| 5,081,457 A | 1/1992 | Motisher et al. | 342/40 |
| 5,089,822 A | 2/1992 | Abaunza et al. | 342/30 |
| 5,113,193 A | 5/1992 | Powell et al. | 342/25 |
| 5,119,102 A | 6/1992 | Barnard | 342/357 |
| 5,132,695 A | 7/1992 | Sumas et al. | 342/461 |
| 5,138,321 A | 8/1992 | Hammer | 342/36 |
| 5,144,315 A | 9/1992 | Schwab et al. | 342/49 |
| 5,153,836 A | 10/1992 | Fraughton et al. | 364/461 |
| 5,179,384 A | 1/1993 | De Haan | 342/37 |
| 5,191,342 A | 3/1993 | Alsup et al. | 342/465 |
| 5,200,902 A | 4/1993 | Pilley | 364/439 |
| 5,225,842 A | 7/1993 | Brown et al. | 342/357 |
| 5,260,702 A | 11/1993 | Thompson | 340/970 |
| 5,262,784 A | 11/1993 | Drobnicki et al. | 342/45 |
| 5,265,023 A | 11/1993 | Sokkappa | 364/439 |
| 5,268,698 A | 12/1993 | Smith et al. | 342/450 |
| 5,283,574 A | 2/1994 | Grove | 340/970 |
| 5,311,194 A | 5/1994 | Brown | 342/357 |
| 5,317,316 A | 5/1994 | Sturm et al. | 342/30 |
| 5,317,317 A | 5/1994 | Billaud et al. | 342/40 |
| 5,339,281 A | 8/1994 | Narendra et al. | 367/5 |
| 5,341,139 A | 8/1994 | Billaud et al. | 342/40 |
| 5,365,516 A | 11/1994 | Jandrell | 370/18 |
| 5,374,932 A | 12/1994 | Wyschogrod et al. | 342/36 |
| 5,379,224 A | 1/1995 | Brown et al. | 364/449 |
| 5,381,140 A | 1/1995 | Kuroda et al. | 340/961 |
| 5,402,116 A | 3/1995 | Ashley | 340/870.1 |
| 5,406,288 A | 4/1995 | Billaud et al. | 342/37 |
| 5,424,746 A | 6/1995 | Schwab et al. | 342/49 |
| 5,424,748 A | 6/1995 | Pourailly et al. | 342/157 |
| 5,438,337 A | 8/1995 | Aguado | 342/357 |
| 5,448,233 A | 9/1995 | Saban et al. | 340/963 |
| 5,450,329 A | 9/1995 | Tanner | 364/449 |
| 5,454,720 A | 10/1995 | FitzGerald et al. | 434/2 |
| 5,455,586 A | 10/1995 | Barbier et al. | 342/37 |
| 5,471,657 A | 11/1995 | Gharpuray | 455/12.1 |
| 5,486,829 A | 1/1996 | Potier et al. | 342/40 |
| 5,493,309 A | 2/1996 | Bjornholt | 342/455 |
| 5,506,590 A | 4/1996 | Minter | 342/462 |
| 5,515,286 A | 5/1996 | Simon | 364/461 |
| 5,528,244 A | 6/1996 | Schwab | 342/37 |
| 5,534,871 A | 7/1996 | Hidaka et al. | 342/113 |
| 5,541,608 A | 7/1996 | Murphy et al. | 342/442 |
| 5,570,095 A | 10/1996 | Drouilhet, Jr. et al. | 342/357 |
| 5,570,099 A | 10/1996 | DesJardins | 342/378 |
| 5,583,775 A | 12/1996 | Nobe et al. | 364/449.7 |
| 5,590,044 A | 12/1996 | Buckreub | 364/453 |
| 5,596,326 A | 1/1997 | Fitts | 342/30 |
| 5,596,332 A | 1/1997 | Coles et al. | 342/455 |
| 5,608,412 A | 3/1997 | Welles, II et al. | 342/457 |
| 5,614,912 A | 3/1997 | Mitchell | 342/146 |
| 5,617,101 A | 4/1997 | Maine et al. | 342/358 |
| 5,627,546 A | 5/1997 | Crow | 342/352 |
| 5,629,691 A | 5/1997 | Jain | 340/961 |
| 5,635,693 A | 6/1997 | Benson et al. | 235/384 |
| 5,659,319 A | 8/1997 | Rost et al. | 342/36 |
| 5,666,110 A | 9/1997 | Paterson | 340/970 |
| 5,670,960 A | 9/1997 | Cessat | 342/25 |
| 5,670,961 A | 9/1997 | Tomita et al. | 342/36 |
| 5,677,841 A | 10/1997 | Shiomi et al. | 365/439 |
| 5,680,140 A | 10/1997 | Loomis | 342/357 |
| 5,686,921 A | 11/1997 | Okada et al. | 342/127 |
| 5,694,322 A | 12/1997 | Westerlage et al. | 364/464.27 |
| 5,714,948 A | 2/1998 | Farmakis et al. | 340/961 |
| 5,732,384 A | 3/1998 | Ellert et al. | 701/120 |
| 5,752,216 A | 5/1998 | Carlson et al. | 701/120 |
| 5,757,314 A | 5/1998 | Gounon et al. | 342/357 |
| 5,774,829 A | 6/1998 | Cisneros et al. | 701/213 |
| 5,781,150 A | 7/1998 | Norris | 342/357 |
| 5,784,022 A | 7/1998 | Kupfer | 342/80 |
| 5,793,329 A | 8/1998 | Nakada et al. | 342/357 |
| 5,798,712 A | 8/1998 | Coquin | 340/970 |
| 5,802,542 A | 9/1998 | Coiera et al. | 711/4 |
| 5,825,021 A | 10/1998 | Uemura | 250/222.1 |
| 5,828,333 A | 10/1998 | Richardson et al. | 342/70 |
| 5,839,080 A | 11/1998 | Muller | 701/9 |
| 5,841,391 A | 11/1998 | Lucas, Jr. et al. | 342/34 |
| 5,841,398 A | 11/1998 | Brock | 342/357 |
| 5,850,420 A | 12/1998 | Guillard et al. | 375/316 |
| 5,867,804 A | 2/1999 | Pilley et al. | 701/120 |
| 5,872,526 A | 2/1999 | Tognazzini | 340/961 |
| 5,884,222 A | 3/1999 | Denoize et al. | 701/301 |
| 5,890,068 A | 3/1999 | Fattouche et al. | 455/456.2 |
| 5,892,462 A | 4/1999 | Tran | 340/961 |
| 5,913,912 A | 6/1999 | Nishimura et al. | 701/35 |
| 5,920,277 A | 7/1999 | Foster et al. | 342/32 |
| 5,920,318 A | 7/1999 | Salvatore, Jr. et al. | 345/418 |
| 5,923,293 A | 7/1999 | Smith et al. | 342/455 |
| 5,949,375 A | 9/1999 | Ishiguro et al. | 342/457 |
| 5,969,674 A | 10/1999 | von der Embse et al. | 342/357.16 |
| 5,977,905 A | 11/1999 | Le Chevalier | 342/163 |
| 5,979,234 A | 11/1999 | Karlsen | 73/170.13 |
| 5,990,833 A | 11/1999 | Ahlbom et al. | 342/417 |
| 5,991,687 A | 11/1999 | Hale et al. | 701/207 |
| 5,995,040 A | 11/1999 | Issler et al. | 342/352 |
| 5,999,116 A | 12/1999 | Evers | 342/36 |
| 6,043,777 A | 3/2000 | Bergman et al. | 342/357 |
| 6,044,322 A | 3/2000 | Stieler | 701/120 |
| 6,049,304 A | 4/2000 | Rudel et al. | 342/357.08 |
| 6,049,754 A | 4/2000 | Beaton et al. | 701/204 |
| 6,075,479 A | 6/2000 | Kudoh | 342/70 |
| 6,081,222 A | 6/2000 | Henkel et al. | 342/45 |
| 6,081,764 A | 6/2000 | Varon | 701/120 |
| 6,085,150 A | 7/2000 | Henry et al. | 701/301 |
| 6,088,634 A | 7/2000 | Muller | 701/9 |
| 6,092,009 A | 7/2000 | Glover | 701/14 |
| 6,094,169 A | 7/2000 | Smith et al. | 342/465 |
| 6,122,570 A | 9/2000 | Muller | 701/9 |
| 6,127,944 A | 10/2000 | Daly | 340/963 |
| 6,133,867 A | 10/2000 | Eberwine et al. | 342/29 |
| 6,138,060 A | 10/2000 | Conner | 701/9 |
| 6,147,748 A | 11/2000 | Hughes | 356/4.09 |
| 6,161,097 A | 12/2000 | Glass et al. | 705/6 |
| 6,178,363 B1 | 1/2001 | McIntyre et al. | 701/16 |
| 6,188,937 B1 | 2/2001 | Sherry et al. | 701/14 |
| 6,195,040 B1 | 2/2001 | Arethens | 342/357.12 |
| 6,195,609 B1 | 2/2001 | Pilley et al. | 701/120 |
| 6,201,499 B1 | 3/2001 | Hawkes et al. | 342/387 |
| 6,208,284 B1 | 3/2001 | Woodell et al. | 342/30 |
| 6,208,937 B1 | 3/2001 | Huddle | 701/221 |
| 6,211,811 B1 | 4/2001 | Evers | 342/36 |
| 6,219,592 B1 | 4/2001 | Muller et al. | 701/9 |
| 6,222,480 B1 | 4/2001 | Kuntman et al. | 342/30 |
| 6,225,942 B1 | 5/2001 | Alon | 342/59 |
| 6,230,018 B1 | 5/2001 | Watters et al. | 455/456 |
| 6,233,522 B1 | 5/2001 | Morici | 701/208 |
| 6,239,739 B1 | 5/2001 | Thomson et al. | 342/96 |
| 6,240,345 B1 | 5/2001 | Vesel | 701/31 |
| 6,246,342 B1 | 6/2001 | Vandevoorde et al. | 340/961 |
| 6,253,147 B1 | 6/2001 | Greenstein | 701/202 |
| 6,271,768 B1 | 8/2001 | Frazier, Jr. et al. | 340/961 |
| 6,275,172 B1 | 8/2001 | Curtis et al. | 340/961 |
| 6,275,767 B1 | 8/2001 | Delseny et al. | 701/120 |
| 6,282,487 B1 | 8/2001 | Shiomi et al. | 701/120 |
| 6,282,488 B1 | 8/2001 | Castor et al. | 701/120 |
| 6,289,280 B1 | 9/2001 | Fernandez-Corbaton | 701/214 |

| | | | |
|---|---|---|---|
| 6,292,721 B1 | 9/2001 | Conner et al. ............. 701/9 |
| 6,311,127 B1 | 10/2001 | Stratton et al. ............. 701/213 |
| 6,314,361 B1 | 11/2001 | Yu et al. ............. 701/120 |
| 6,314,363 B1 | 11/2001 | Pilley et al. ............. 701/120 |
| 6,317,663 B1 | 11/2001 | Meunier et al. ............. 701/16 |
| 6,321,091 B1 | 11/2001 | Holland ............. 455/456 |
| 6,327,471 B1 | 12/2001 | Song ............. 455/440 |
| 6,329,947 B2 | 12/2001 | Smith ............. 342/418 |
| 6,337,652 B1 | 1/2002 | Shiomi et al. ............. 342/37 |
| 6,338,011 B1 | 1/2002 | Furst et al. ............. 701/1 |
| 6,339,745 B1 | 1/2002 | Novik ............. 701/208 |
| 6,340,935 B1 | 1/2002 | Hall ............. 340/932.2 |
| 6,340,947 B1 | 1/2002 | Chang et al. ............. 342/357.01 |
| 6,344,820 B1 | 2/2002 | Shiomi et al. ............. 342/174 |
| 6,347,263 B1 | 2/2002 | Johnson et al. ............. 701/14 |
| 6,348,856 B1 | 2/2002 | Jones et al. ............. 340/10.1 |
| 6,366,240 B1 | 4/2002 | Timothy et al. ............. 342/417 |
| 6,377,208 B2 | 4/2002 | Chang et al. ............. 342/357.01 |
| 6,380,869 B1 | 4/2002 | Simon et al. ............. 340/945 |
| 6,380,870 B1 | 4/2002 | Conner et al. ............. 340/970 |
| 6,384,783 B1 | 5/2002 | Smith et al. ............. 342/387 |
| 6,393,359 B1 | 5/2002 | Flynn et al. ............. 701/120 |
| 6,396,435 B1 | 5/2002 | Fleischhauer et al. ............. 342/70 |
| 6,408,233 B1 | 6/2002 | Solomon et al. ............. 701/35 |
| 6,414,629 B1 | 7/2002 | Curcio ............. 342/357.08 |
| 6,415,219 B1 | 7/2002 | Degodyuk ............. 70/117 |
| 6,420,993 B1 | 7/2002 | Varon ............. 342/36 |
| 6,445,310 B1 | 9/2002 | Bateman et al. ............. 340/970 |
| 6,445,927 B1 | 9/2002 | Kng et al. ............. 455/456 |
| 6,448,929 B1 | 9/2002 | Smith et al. ............. 342/456 |
| 6,459,411 B2 | 10/2002 | Frazier et al. ............. 342/455 |
| 6,462,674 B2 | 10/2002 | Ohmura et al. ............. 340/901 |
| 6,463,383 B1 | 10/2002 | Baiada et al. ............. 701/120 |
| 6,469,654 B1 | 10/2002 | Winner et al. ............. 342/33 |
| 6,469,655 B1 | 10/2002 | Franke et al. ............. 342/36 |
| 6,469,664 B1 | 10/2002 | Michaelson et al. ............. 342/357.13 |
| 6,473,027 B1 | 10/2002 | Alon ............. 342/37 |
| 6,473,694 B1 | 10/2002 | Akopian et al. ............. 701/213 |
| 6,477,449 B1 | 11/2002 | Conner et al. ............. 701/4 |
| 6,492,932 B1 | 12/2002 | Jin et al. ............. 342/25 |
| 6,493,610 B1 | 12/2002 | Ezaki ............. 701/3 |
| 6,504,490 B2 | 1/2003 | Mizushima ............. 340/943 |
| 6,518,916 B1 | 2/2003 | Ashihara et al. ............. 342/70 |
| 6,522,295 B2 | 2/2003 | Baugh et al. ............. 342/453 |
| 6,531,978 B2 | 3/2003 | Tran ............. 342/29 |
| 6,542,809 B2 | 4/2003 | Hehls, III ............. 701/120 |
| 6,542,810 B2 | 4/2003 | Lai ............. 701/120 |
| 6,545,631 B2 | 4/2003 | Hudson et al. ............. 342/30 |
| 6,549,829 B1 | 4/2003 | Anderson et al. ............. 701/16 |
| 6,563,432 B1 | 5/2003 | Millgard ............. 340/961 |
| 6,567,043 B2 | 5/2003 | Smith et al. ............. 342/450 |
| 6,571,155 B2 | 5/2003 | Carriker et al. ............. 701/3 |
| 6,584,400 B2 | 6/2003 | Beardsworth ............. 701/120 |
| 6,584,414 B1 | 6/2003 | Green et al. ............. 702/33 |
| 6,587,079 B1 | 7/2003 | Rickard et al. ............. 342/387 |
| 6,606,034 B1 | 8/2003 | Muller et al. ............. 340/970 |
| 6,606,563 B2 | 8/2003 | Corcoran, III ............. 701/301 |
| 6,615,648 B1 | 9/2003 | Ferguson et al. ............. 73/146 |
| 6,617,997 B2 | 9/2003 | Ybarra et al. ............. 342/29 |
| 6,618,008 B1 | 9/2003 | Scholz ............. 342/427 |
| 6,633,259 B1 | 10/2003 | Smith et al. ............. 342/456 |
| 6,657,578 B2 | 12/2003 | Stayton ............. 342/30 |
| 6,680,687 B2 | 1/2004 | Phelipot ............. 342/29 |
| 6,690,295 B1 | 2/2004 | De Boer ............. 340/951 |
| 6,690,618 B2 | 2/2004 | Tomasi et al. ............. 367/127 |
| 6,691,004 B2 | 2/2004 | Johnson ............. 701/14 |
| 6,707,394 B2 | 3/2004 | Ishihara et al. ............. 340/970 |
| 6,710,719 B1 | 3/2004 | Jones et al. ............. 340/825.49 |
| 6,710,723 B2 | 3/2004 | Muller ............. 340/970 |
| 6,714,782 B1 | 3/2004 | Monot et al. ............. 455/431 |
| 6,721,652 B1 | 4/2004 | Sanqunetti ............. 701/207 |
| 6,744,396 B2 | 6/2004 | Stone et al. ............. 342/36 |
| 6,750,815 B2 | 6/2004 | Michaelson et al. ............. 342/357.13 |
| 6,751,545 B2 | 6/2004 | Walter ............. 701/120 |
| 6,760,387 B2 | 7/2004 | Langford et al. ............. 375/267 |
| 6,765,533 B2 | 7/2004 | Szajnowski ............. 342/465 |
| 6,789,011 B2 | 9/2004 | Baiada et al. ............. 701/120 |
| 6,789,016 B2 | 9/2004 | Bayh et al. ............. 701/301 |
| 6,792,058 B1 | 9/2004 | Hershey et al. ............. 375/347 |
| 6,798,381 B2 | 9/2004 | Benner et al. ............. 342/450 |
| 6,799,114 B2 | 9/2004 | Etnyre ............. 701/120 |
| 6,801,152 B1 | 10/2004 | Rose ............. 342/13 |
| 6,801,155 B2 | 10/2004 | Jahangir et al. ............. 342/90 |
| 6,809,679 B2 | 10/2004 | LaFrey et al. ............. 342/37 |
| 6,810,329 B2 | 10/2004 | Koga ............. 701/211 |
| 6,812,890 B2 | 11/2004 | Smith et al. ............. 342/454 |
| 6,816,105 B2 | 11/2004 | Winner et al. ............. 342/37 |
| 6,819,282 B1 | 11/2004 | Galati et al. ............. 342/37 |
| 6,823,188 B1 | 11/2004 | Stern ............. 455/456.1 |
| 6,828,921 B2 | 12/2004 | Brown et al. ............. 340/945 |
| 6,845,362 B2 | 1/2005 | Furuta et al. ............. 705/13 |
| 6,861,982 B2 | 3/2005 | Forstrom et al. ............. 342/387 |
| 6,862,519 B2 | 3/2005 | Walter ............. 701/120 |
| 6,862,541 B2 | 3/2005 | Mizushima ............. 702/26 |
| 6,865,484 B2 | 3/2005 | Miyasaka et al. ............. 701/213 |
| 6,873,269 B2 | 3/2005 | Tran ............. 340/961 |
| 6,873,903 B2 | 3/2005 | Baiada et al. ............. 701/120 |
| 6,876,859 B2 | 4/2005 | Anderson et al. ............. 455/456.1 |
| 6,882,930 B2 | 4/2005 | Trayford et al. ............. 701/117 |
| 6,885,340 B2 | 4/2005 | Smith et al. ............. 342/465 |
| 6,900,760 B2 | 5/2005 | Groves ............. 342/357.14 |
| 6,912,461 B2 | 6/2005 | Poreda ............. 701/120 |
| 6,927,701 B2 | 8/2005 | Schmidt et al. ............. 340/959 |
| 6,930,638 B2 | 8/2005 | Lloyd et al. ............. 342/453 |
| 6,952,631 B2 | 10/2005 | Griffith et al. ............. 701/13 |
| 6,963,304 B2 | 11/2005 | Murphy ............. 342/357.02 |
| 6,967,616 B2 | 11/2005 | Etnyre ............. 342/182 |
| 6,977,612 B1 | 12/2005 | Bennett ............. 342/357.07 |
| 6,985,103 B2 | 1/2006 | Ridderheim et al. ............. 342/30 |
| 6,985,743 B2 | 1/2006 | Bajikar ............. 455/456.1 |
| 6,992,626 B2 | 1/2006 | Smith ............. 342/454 |
| 7,006,032 B2 | 2/2006 | King et al. ............. 342/29 |
| 7,012,552 B2 | 3/2006 | Baugh et al. ............. 340/945 |
| 7,026,987 B2 | 4/2006 | Lokshin et al. ............. 342/357.12 |
| 7,030,780 B2 | 4/2006 | Shiomi et al. ............. 340/961 |
| 7,043,355 B2 | 5/2006 | Lai ............. 701/120 |
| 7,050,909 B2 | 5/2006 | Nichols et al. ............. 701/301 |
| 7,053,792 B2 | 5/2006 | Aoki et al. ............. 340/928 |
| 7,058,506 B2 | 6/2006 | Kawase et al. ............. 701/201 |
| 7,062,381 B1 | 6/2006 | Rekow et al. ............. 701/300 |
| 7,065,443 B2 | 6/2006 | Flynn et al. ............. 701/120 |
| 7,071,843 B2 | 7/2006 | Hashida et al. ............. 340/995.12 |
| 7,071,867 B2 | 7/2006 | Wittenberg et al. ............. 342/70 |
| 7,079,925 B2 | 7/2006 | Kubota et al. ............. 701/1 |
| 7,095,360 B2 | 8/2006 | Kuji et al. ............. 342/29 |
| 7,102,570 B2 | 9/2006 | Bar-On et al. ............. 342/465 |
| 7,106,212 B2 | 9/2006 | Konishi et al. ............. 340/905 |
| 7,109,889 B2 | 9/2006 | He ............. 340/971 |
| 7,117,089 B2 | 10/2006 | Khatwa et al. ............. 701/301 |
| 7,120,537 B2 | 10/2006 | Flynn et al. ............. 701/120 |
| 7,123,169 B2 | 10/2006 | Farmer et al. ............. 340/945 |
| 7,123,192 B2 | 10/2006 | Smith et al. ............. 342/455 |
| 7,126,534 B2 | 10/2006 | Smith et al. ............. 342/456 |
| 7,136,059 B2 | 11/2006 | Kraud et al. ............. 345/419 |
| 7,142,154 B2 | 11/2006 | Quilter et al. ............. 342/357.06 |
| 7,148,816 B1 | 12/2006 | Carrico ............. 340/961 |
| 7,155,240 B2 | 12/2006 | Atkinson et al. ............. 455/456.2 |
| 7,164,986 B2 | 1/2007 | Humphries et al. ............. 701/207 |
| 7,170,441 B2 | 1/2007 | Perl et al. ............. 342/29 |
| 7,170,820 B2 | 1/2007 | Szajnowski ............. 367/127 |
| 7,187,327 B2 | 3/2007 | Coluzzi et al. ............. 342/458 |
| 7,190,303 B2 | 3/2007 | Rowlan ............. 342/29 |
| 7,196,621 B2 | 3/2007 | Kochis ............. 340/539.13 |
| 7,206,698 B2 | 4/2007 | Conner et al. ............. 701/301 |
| 7,218,276 B2 | 5/2007 | Teranishi ............. 342/357.1 |
| 7,218,278 B1 | 5/2007 | Arethens ............. 342/367.03 |
| 7,221,308 B2 | 5/2007 | Burton et al. ............. 342/42 |
| 7,228,207 B2 | 6/2007 | Clarke et al. ............. 701/3 |
| 7,233,545 B2 | 6/2007 | Harvey, Jr. et al. ............. 367/127 |
| 7,248,963 B2 | 7/2007 | Baiada et al. ............. 701/120 |
| 7,250,901 B2 | 7/2007 | Stephens ............. 342/146 |
| 7,257,469 B1 | 8/2007 | Pemble ............. 701/3 |
| 7,272,495 B2 | 9/2007 | Coluzzi et al. ............. 701/207 |
| 7,277,052 B2 | 10/2007 | Delaveau et al. ............. 342/387 |
| 7,286,624 B2 | 10/2007 | Woo et al. ............. 375/356 |
| 7,307,578 B2 | 12/2007 | Blaskovich et al. ............. 342/29 |
| 7,308,343 B1 | 12/2007 | Horvath et al. ............. 701/3 |
| 7,321,813 B2 | 1/2008 | Meunier ............. 701/10 |

| | | | |
|---|---|---|---|
| 7,333,052 B2 | 2/2008 | Maskell | 342/195 |
| 7,333,887 B2 | 2/2008 | Baiada et al. | 701/120 |
| 7,352,318 B2 | 4/2008 | Osman et al. | 342/37 |
| 7,358,854 B2 | 4/2008 | Egner et al. | 340/539.13 |
| 7,379,165 B2 | 5/2008 | Anderson et al. | 356/5.05 |
| 7,382,286 B2 | 6/2008 | Cole et al. | 340/961 |
| 7,383,104 B2 | 6/2008 | Ishii et al. | 701/3 |
| 7,383,124 B1 | 6/2008 | Vesel | 701/200 |
| 7,385,527 B1 | 6/2008 | Clavier et al. | 340/945 |
| 7,391,359 B2 | 6/2008 | Ootomo et al. | 342/37 |
| 7,398,157 B2 | 7/2008 | Sigurdsson et al. | 701/213 |
| 7,400,297 B2 | 7/2008 | Ferreol et al. | 342/377 |
| 7,408,497 B2 | 8/2008 | Billaud et al. | 342/30 |
| 7,408,498 B2 | 8/2008 | Kuji et al. | 342/37 |
| 7,420,501 B2 | 9/2008 | Perl | 342/30 |
| 7,430,218 B2 | 9/2008 | Lee et al. | 370/464 |
| 7,437,225 B1 | 10/2008 | Rathinam | 701/14 |
| 7,440,846 B2 | 10/2008 | Irie et al. | 701/200 |
| 7,457,690 B2 | 11/2008 | Wilson, Jr. | 701/3 |
| 7,460,866 B2 | 12/2008 | Salkini et al. | 455/431 |
| 7,460,871 B2 | 12/2008 | Humphries et al. | 455/456.1 |
| 7,477,145 B2 | 1/2009 | Tatton et al. | 340/531 |
| 7,479,919 B2 | 1/2009 | Poe et al. | 342/30 |
| 7,479,922 B2 | 1/2009 | Hunt et al. | 342/357.02 |
| 7,479,923 B2 | 1/2009 | Carpenter | 342/357.02 |
| 7,479,925 B2 | 1/2009 | Schell | 342/455 |
| 7,487,108 B2 | 2/2009 | Aoki et al. | 705/13 |
| 7,501,977 B2 | 3/2009 | Ino | 342/37 |
| 7,504,996 B2 | 3/2009 | Martin | 342/357.12 |
| 7,515,715 B2 | 4/2009 | Olive | 380/255 |
| 2001/0014847 A1 | 8/2001 | Keenan | 701/117 |
| 2001/0026240 A1 | 10/2001 | Neher | 342/357.07 |
| 2002/0021247 A1 | 2/2002 | Smith et al. | 342/450 |
| 2002/0089433 A1 | 7/2002 | Bateman et al. | 340/970 |
| 2002/0152029 A1 | 10/2002 | Sainthuile et al. | 701/301 |
| 2003/0004641 A1 | 1/2003 | Corwin et al. | 701/301 |
| 2003/0009267 A1 | 1/2003 | Dunsky et al. | 701/4 |
| 2003/0097216 A1 | 5/2003 | Etnyre | 701/120 |
| 2003/0152248 A1 | 8/2003 | Spark et al. | 382/103 |
| 2003/0158799 A1 | 8/2003 | Kakihara et al. | 705/30 |
| 2004/0002886 A1 | 1/2004 | Dickerson et al. | |
| 2004/0004554 A1 | 1/2004 | Srinivasan et al. | 340/870.01 |
| 2004/0039806 A1 | 2/2004 | Miras | 709/223 |
| 2004/0044463 A1 | 3/2004 | Shing-Feng et al. | 701/120 |
| 2004/0086121 A1 | 5/2004 | Viggiano et al. | 380/255 |
| 2004/0094622 A1 | 5/2004 | Vismara | 235/384 |
| 2004/0210371 A1 | 10/2004 | Adachi et al. | 701/50 |
| 2004/0225432 A1 | 11/2004 | Pilley et al. | 701/117 |
| 2004/0266341 A1 | 12/2004 | Teunon | 455/12.1 |
| 2005/0007272 A1 | 1/2005 | Smith et al. | 342/189 |
| 2005/0021283 A1 | 1/2005 | Brinton et al. | 702/150 |
| 2005/0046569 A1 | 3/2005 | Spriggs et al. | 340/551 |
| 2005/0057395 A1 | 3/2005 | Atkinson | |
| 2005/0159170 A1 | 7/2005 | Humphries et al. | 455/456.1 |
| 2005/1066672 | 8/2005 | Atkinson | 73/290 |
| 2005/0192717 A1 | 9/2005 | Tafs et al. | 701/3 |
| 2005/0228715 A1 | 10/2005 | Hartig et al. | 705/13 |
| 2005/0231422 A1 | 10/2005 | Etnyre | 342/182 |
| 2006/0023655 A1 | 2/2006 | Engel et al. | 370/328 |
| 2006/0044184 A1 | 3/2006 | Kimura | 342/357.09 |
| 2006/0052933 A1 | 3/2006 | Ota | 701/200 |
| 2006/0119515 A1 | 6/2006 | Smith | 342/450 |
| 2006/0129310 A1 | 6/2006 | Tarrant et al. | 701/201 |
| 2006/0161340 A1 | 7/2006 | Lee | 701/207 |
| 2006/0167598 A1 | 7/2006 | Pennarola | 701/11 |
| 2006/0181447 A1 | 8/2006 | Kuji et al. | 342/32 |
| 2006/0191326 A1 | 8/2006 | Smith et al. | 73/73 |
| 2006/0208924 A1 | 9/2006 | Matalon | 340/933 |
| 2006/0250305 A1 | 11/2006 | Coluzzi et al. | 342/458 |
| 2006/0262014 A1 | 11/2006 | Shemesh et al. | 342/386 |
| 2006/0265664 A1 | 11/2006 | Simons et al. | 715/722 |
| 2006/0276201 A1 | 12/2006 | Dupray | 455/456.1 |
| 2007/0001903 A1 | 1/2007 | Smith et al. | 342/387 |
| 2007/0040734 A1 | 2/2007 | Evers | 342/126 |
| 2007/0060079 A1 | 3/2007 | Nakagawa et al. | 455/131 |
| 2007/0090295 A1 | 4/2007 | Parkinson et al. | 250/349 |
| 2007/0106436 A1 | 5/2007 | Johansson | 701/23 |
| 2007/0109184 A1 | 5/2007 | Shyr et al. | 342/357.06 |
| 2007/0159356 A1 | 7/2007 | Borel et al. | 340/945 |
| 2007/0159378 A1 | 7/2007 | Powers et al. | 342/29 |
| 2007/0182589 A1 | 8/2007 | Tran | 340/961 |
| 2007/0213887 A1 | 9/2007 | Woodings | 701/1 |
| 2007/0222665 A1 | 9/2007 | Koeneman | 342/29 |
| 2007/0250259 A1 | 10/2007 | Dare | 701/201 |
| 2007/0252750 A1 | 11/2007 | Jean et al. | 342/40 |
| 2007/0298786 A1 | 12/2007 | Meyers et al. | 455/431 |
| 2008/0027596 A1 | 1/2008 | Conner et al. | 701/16 |
| 2008/0042880 A1 | 2/2008 | Ramaiah et al. | 340/958 |
| 2008/0042902 A1 | 2/2008 | Brandwood et al. | 342/465 |
| 2008/0062011 A1 | 3/2008 | Butler et al. | 340/961 |
| 2008/0063123 A1 | 3/2008 | De Mey et al. | 375/350 |
| 2008/0068250 A1 | 3/2008 | Brandao et al. | 342/30 |
| 2008/0088508 A1 | 4/2008 | Smith | 342/453 |
| 2008/0010643 A1 | 5/2008 | Clark et al. | 340/972 |
| 2008/0106457 A1 | 5/2008 | Bartolini et al. | 342/40 |
| 2008/0109343 A1 | 5/2008 | Robinson et al. | 705/37 |
| 2008/0117106 A1 | 5/2008 | Sarno et al. | 342/444 |
| 2008/0120032 A1 | 5/2008 | Brandao et al. | 701/300 |
| 2008/0129601 A1 | 6/2008 | Thomas | 342/465 |
| 2008/0132270 A1 | 6/2008 | Basir | 455/550.1 |
| 2008/0137524 A1 | 6/2008 | Anderson et al. | 370/203 |
| 2008/0150784 A1 | 6/2008 | Zhang et al. | 342/30 |
| 2008/0158040 A1 | 7/2008 | Stayton et al. | 342/32 |
| 2008/0158059 A1 | 7/2008 | Bull et al. | 342/387 |
| 2008/0174472 A1 | 7/2008 | Stone et al. | 342/30 |
| 2008/0183344 A1 | 7/2008 | Doyen et al. | 701/9 |
| 2008/0186224 A1 | 8/2008 | Ichiyanagi et al. | 342/109 |
| 2008/0186231 A1 | 8/2008 | Aljadeff et al. | 342/387 |
| 2008/0195093 A1 | 8/2008 | Prinzel, III et al. | 701/208 |
| 2008/0231494 A1 | 9/2008 | Galati | 342/37 |
| 2008/0252528 A1 | 10/2008 | Shen et al. | 342/451 |
| 2008/0266166 A1 | 10/2008 | Schuchman | 342/97 |
| 2008/0272227 A1 | 11/2008 | Sharpe | 244/3.16 |
| 2008/0275642 A1 | 11/2008 | Clark et al. | 701/201 |
| 2008/0294306 A1 | 11/2008 | Huynh et al. | 701/3 |
| 2008/0297398 A1 | 12/2008 | Kamimura | 342/38 |
| 2009/0005960 A1 | 1/2009 | Roberts et al. | 701/120 |
| 2009/0009357 A1 | 1/2009 | Heen et al. | 340/825.09 |
| 2009/0012660 A1 | 1/2009 | Roberts et al. | 701/3 |
| 2009/0012661 A1 | 1/2009 | Louis | 701/9 |
| 2009/0015471 A1 | 1/2009 | Shen et al. | 342/357.15 |
| 2009/0027270 A1 | 1/2009 | Fisher et al. | 342/387 |
| 2009/0051570 A1 | 2/2009 | Clark et al. | 340/971 |
| 2009/0055038 A1 | 2/2009 | Garrec et al. | 701/17 |

FOREIGN PATENT DOCUMENTS

| | | |
|---|---|---|
| DE | 4204164 A1 | 8/1993 |
| DE | 19751092 A1 | 6/1999 |
| DE | 10149006 A1 | 4/2003 |
| DE | 202004007747 U1 | 9/2004 |
| DE | 202006005089 U1 | 6/2006 |
| DE | 60119785 T2 | 4/2007 |
| DE | 102006009121 A1 | 8/2007 |
| EP | 0265902 A2 | 5/1988 |
| EP | 265902 A2 | 5/1988 |
| EP | 303371 A1 | 2/1989 |
| EP | 0346461 A1 | 12/1989 |
| EP | 346461 A1 | 12/1989 |
| EP | 0466239 | 1/1992 |
| EP | 444738 A3 | 8/1992 |
| EP | 514826 A1 | 11/1992 |
| EP | 0514826 A1 | 11/1992 |
| EP | 303371 B1 | 3/1993 |
| EP | 550073 A2 | 7/1993 |
| EP | 0550073 A2 | 7/1993 |
| EP | 574009 A3 | 6/1994 |
| EP | 05740093 A3 | 6/1994 |
| EP | 0613110 A1 | 8/1994 |
| EP | 613110 A1 | 8/1994 |
| EP | 613111 A1 | 8/1994 |
| EP | 0613111 A1 | 8/1994 |
| EP | 614092 A1 | 9/1994 |
| EP | 0614092 A1 | 9/1994 |
| EP | 609162 A3 | 10/1994 |
| EP | 620449 A1 | 10/1994 |
| EP | 327447 B1 | 11/1994 |
| EP | 200787 B1 | 12/1994 |
| EP | 287261 B1 | 12/1994 |

| | | | | | | |
|---|---|---|---|---|---|---|
| EP | 629877 | A1 | 12/1994 | EP | 809811 B1 | 7/2001 |
| EP | 0629877 | A1 | 12/1994 | EP | 915349 B1 | 7/2001 |
| EP | 412441 | B1 | 1/1995 | EP | 1118871 A2 | 7/2001 |
| EP | 653643 | A2 | 5/1995 | EP | 732676 B1 | 9/2001 |
| EP | 355336 | B1 | 8/1995 | EP | 747721 B1 | 9/2001 |
| EP | 0355336 | B1 | 8/1995 | EP | 970390 B1 | 9/2001 |
| EP | 0670566 | A2 | 9/1995 | EP | 0877997 B1 | 12/2001 |
| EP | 670566 | A2 | 9/1995 | EP | 877997 B1 | 12/2001 |
| EP | 671634 | A2 | 9/1995 | EP | 1162435 A2 | 12/2001 |
| EP | 674299 | A1 | 9/1995 | EP | 767388 B1 | 1/2002 |
| EP | 681229 | A1 | 11/1995 | EP | 902899 B1 | 1/2002 |
| EP | 682332 | A1 | 11/1995 | EP | 1195670 A2 | 4/2002 |
| EP | 0682332 | A1 | 11/1995 | EP | 1197924 A1 | 4/2002 |
| EP | 284075 | B1 | 12/1995 | EP | 0778470 B1 | 5/2002 |
| EP | 714082 | A2 | 5/1996 | EP | 778470 B1 | 5/2002 |
| EP | 0505827 | B1 | 6/1996 | EP | 1202233 A1 | 5/2002 |
| EP | 505827 | B1 | 6/1996 | EP | 681278 B1 | 6/2002 |
| EP | 385600 | B1 | 7/1996 | EP | 807915 B1 | 6/2002 |
| EP | 0385600 | B1 | 7/1996 | EP | 1197924 A4 | 6/2002 |
| EP | 649033 | A3 | 7/1996 | EP | 792461 B1 | 7/2002 |
| EP | 653643 | A3 | 7/1996 | EP | 865004 B1 | 7/2002 |
| EP | 564322 | B1 | 8/1996 | EP | 0865004 B1 | 7/2002 |
| EP | 725377 | A2 | 8/1996 | EP | 512789 B1 | 8/2002 |
| EP | 466239 | B1 | 9/1996 | EP | 780700 B1 | 9/2002 |
| EP | 560658 | B1 | 9/1996 | EP | 671634 B1 | 10/2002 |
| EP | 637819 | A3 | 9/1996 | EP | 1248117 A2 | 10/2002 |
| EP | 0732596 | A2 | 9/1996 | EP | 1260833 A2 | 11/2002 |
| EP | 732596 | A2 | 9/1996 | EP | 1109032 B1 | 3/2003 |
| EP | 671634 | A3 | 11/1996 | EP | 1289172 A2 | 3/2003 |
| EP | 744630 | A2 | 11/1996 | EP | 818691 B1 | 4/2003 |
| EP | 750238 | A1 | 12/1996 | EP | 1300689 A2 | 4/2003 |
| EP | 0487940 | B1 | 1/1997 | EP | 1168274 B1 | 5/2003 |
| EP | 487940 | B1 | 1/1997 | EP | 1318492 A2 | 6/2003 |
| EP | 577480 | B1 | 2/1997 | EP | 1331620 A1 | 7/2003 |
| EP | 596784 | B1 | 3/1997 | EP | 1333404 A1 | 8/2003 |
| EP | 725377 | A3 | 3/1997 | EP | 1333405 A1 | 8/2003 |
| EP | 774148 | A1 | 5/1997 | EP | 1147506 B1 | 9/2003 |
| EP | 0774148 | A1 | 5/1997 | EP | 1345044 A1 | 9/2003 |
| EP | 780700 | A2 | 6/1997 | EP | 1353148 A2 | 10/2003 |
| EP | 399180 | B1 | 7/1997 | EP | 1357358 A1 | 10/2003 |
| EP | 786672 | A1 | 7/1997 | EP | 1369704 A1 | 12/2003 |
| EP | 629878 | B1 | 9/1997 | EP | 1372127 A1 | 12/2003 |
| EP | 793116 | A2 | 9/1997 | EP | 936474 B1 | 1/2004 |
| EP | 317630 | B1 | 10/1997 | EP | 1380852 A1 | 1/2004 |
| EP | 807915 | A1 | 11/1997 | EP | 748082 B1 | 2/2004 |
| EP | 744630 | A3 | 12/1997 | EP | 1302920 B1 | 2/2004 |
| EP | 0578316 | B1 | 4/1998 | EP | 786672 B1 | 3/2004 |
| EP | 578316 | B1 | 4/1998 | EP | 1396832 A1 | 3/2004 |
| EP | 633481 | B1 | 5/1998 | EP | 1406228 A2 | 4/2004 |
| EP | 843179 | A1 | 5/1998 | EP | 1414002 A1 | 4/2004 |
| EP | 760955 | B1 | 6/1998 | EP | 1070968 B1 | 5/2004 |
| EP | 577479 | B1 | 11/1998 | EP | 1431946 A1 | 6/2004 |
| EP | 588598 | B1 | 1/1999 | EP | 1309947 B1 | 8/2004 |
| EP | 915349 | A1 | 5/1999 | EP | 1450331 A1 | 8/2004 |
| EP | 0915349 | A1 | 5/1999 | EP | 1287514 B1 | 10/2004 |
| EP | 679906 | B1 | 8/1999 | EP | 1464988 A1 | 10/2004 |
| EP | 735382 | B1 | 9/1999 | EP | 1467575 A1 | 10/2004 |
| EP | 860708 | A3 | 9/1999 | EP | 1471365 | 10/2004 |
| EP | 774148 | A4 | 10/1999 | EP | 903589 B1 | 11/2004 |
| EP | 860710 | A3 | 10/1999 | EP | 0903589 B1 | 11/2004 |
| EP | 905528 | A3 | 10/1999 | EP | 805358 B1 | 12/2004 |
| EP | 653643 | B1 | 1/2000 | EP | 1484619 A2 | 12/2004 |
| EP | 674299 | B1 | 1/2000 | EP | 1489578 A2 | 12/2004 |
| EP | 926511 | A3 | 1/2000 | EP | 1500951 A1 | 1/2005 |
| EP | 987562 | A1 | 3/2000 | EP | 1018033 B1 | 3/2005 |
| EP | 989386 | A1 | 3/2000 | EP | 1512988 A1 | 3/2005 |
| EP | 990921 | A2 | 4/2000 | EP | 1517281 A2 | 3/2005 |
| EP | 681229 | B1 | 5/2000 | EP | 1331620 B1 | 4/2005 |
| EP | 1008947 | A1 | 6/2000 | EP | 1524191 A1 | 4/2005 |
| EP | 1014104 | A2 | 6/2000 | EP | 1531340 A1 | 5/2005 |
| EP | 545636 | B1 | 8/2000 | EP | 860708 B1 | 7/2005 |
| EP | 1045256 | A1 | 10/2000 | EP | 1555542 A2 | 7/2005 |
| EP | 1045257 | A1 | 10/2000 | EP | 1555543 A2 | 7/2005 |
| EP | 1052603 | A2 | 11/2000 | EP | 1557807 A2 | 7/2005 |
| EP | 1022580 | A3 | 2/2001 | EP | 0926510 B1 | 8/2005 |
| EP | 1079204 | A1 | 2/2001 | EP | 926510 B1 | 8/2005 |
| EP | 718637 | B1 | 6/2001 | EP | 926511 B1 | 8/2005 |
| EP | 715740 | B1 | 7/2001 | EP | 1564564 A2 | 8/2005 |
| EP | 716317 | B1 | 7/2001 | EP | 1405286 B1 | 9/2005 |

| | | | | | | |
|---|---|---|---|---|---|---|
| EP | 1485730 | B1 | 9/2005 | EP | 1843161 A2 | 10/2007 |
| EP | 919830 | B1 | 10/2005 | EP | 1860456 A1 | 11/2007 |
| EP | 1428195 | B1 | 10/2005 | EP | 1316079 B1 | 1/2008 |
| EP | 1461793 | B1 | 10/2005 | EP | 1873554 A1 | 1/2008 |
| EP | 1585082 | A1 | 10/2005 | EP | 1881339 A1 | 1/2008 |
| EP | 1146482 | B1 | 11/2005 | EP | 1883057 A2 | 1/2008 |
| EP | 1506531 | B1 | 11/2005 | EP | 1318492 B1 | 2/2008 |
| EP | 1600788 | A1 | 11/2005 | EP | 1512988 B1 | 2/2008 |
| EP | 1094336 | B1 | 12/2005 | EP | 1884462 A1 | 2/2008 |
| EP | 1450331 | B1 | 12/2005 | EP | 1884908 A2 | 2/2008 |
| EP | 1603098 | A1 | 12/2005 | EP | 1887542 A2 | 2/2008 |
| EP | 1610151 | A2 | 12/2005 | EP | 1101385 B1 | 3/2008 |
| EP | 1019862 | B1 | 1/2006 | EP | 1291670 B1 | 3/2008 |
| EP | 1125415 | B1 | 1/2006 | EP | 1901085 A1 | 3/2008 |
| EP | 1489382 | B1 | 1/2006 | EP | 1901087 A1 | 3/2008 |
| EP | 860709 | B1 | 3/2006 | EP | 1901090 A1 | 3/2008 |
| EP | 1205732 | B1 | 3/2006 | EP | 0964268 B1 | 4/2008 |
| EP | 1497808 | B1 | 3/2006 | EP | 964268 B1 | 4/2008 |
| EP | 1632787 | A1 | 3/2006 | EP | 1306689 B1 | 4/2008 |
| EP | 1632892 | A2 | 3/2006 | EP | 1417510 B1 | 4/2008 |
| EP | 1635189 | A1 | 3/2006 | EP | 1483755 B1 | 4/2008 |
| EP | 1640743 | A2 | 3/2006 | EP | 1906204 A2 | 4/2008 |
| EP | 1640743 | A3 | 3/2006 | EP | 1906204 A3 | 4/2008 |
| EP | 1108994 | B1 | 4/2006 | EP | 1912077 A2 | 4/2008 |
| EP | 1570453 | B1 | 4/2006 | EP | 1912079 A2 | 4/2008 |
| EP | 953261 | B1 | 6/2006 | EP | 1709611 B1 | 5/2008 |
| EP | 0953261 | B1 | 6/2006 | EP | 1918898 A2 | 5/2008 |
| EP | 1031847 | B1 | 6/2006 | EP | 1331490 B1 | 6/2008 |
| EP | 1275975 | B1 | 6/2006 | EP | 1464988 B1 | 6/2008 |
| EP | 1285232 | B1 | 6/2006 | EP | 1554707 B1 | 6/2008 |
| EP | 1666917 | A2 | 6/2006 | EP | 1651979 B1 | 6/2008 |
| EP | 1672384 | A2 | 6/2006 | EP | 1927864 A1 | 6/2008 |
| EP | 987562 | B1 | 7/2006 | EP | 1723622 B1 | 7/2008 |
| EP | 0987562 | B1 | 7/2006 | EP | 1761797 B1 | 7/2008 |
| EP | 1579404 | B1 | 7/2006 | EP | 1942351 A1 | 7/2008 |
| EP | 1681657 | A1 | 7/2006 | EP | 989386 B1 | 8/2008 |
| EP | 1326212 | B1 | 9/2006 | EP | 1014104 B1 | 8/2008 |
| EP | 1372127 | B1 | 9/2006 | EP | 1327159 B1 | 8/2008 |
| EP | 1381882 | B1 | 9/2006 | EP | 1436641 B1 | 8/2008 |
| EP | 1524191 | B1 | 9/2006 | EP | 1839070 B1 | 8/2008 |
| EP | 1707979 | A2 | 10/2006 | EP | 1953565 A1 | 8/2008 |
| EP | 824731 | B1 | 11/2006 | EP | 1956342 A1 | 8/2008 |
| EP | 1093564 | B1 | 11/2006 | EP | 1956389 A1 | 8/2008 |
| EP | 1218694 | B1 | 11/2006 | EP | 1956575 A1 | 8/2008 |
| EP | 1493040 | B1 | 11/2006 | EP | 1483902 B1 | 9/2008 |
| EP | 1717600 | A1 | 11/2006 | EP | 1965219 A1 | 9/2008 |
| EP | 1724603 | A2 | 11/2006 | EP | 1967864 A2 | 9/2008 |
| EP | 1727094 | A2 | 11/2006 | EP | 1972962 A2 | 9/2008 |
| EP | 905528 | B1 | 12/2006 | EP | 1269214 B1 | 10/2008 |
| EP | 1303767 | B1 | 12/2006 | EP | 1717600 B1 | 10/2008 |
| EP | 1090309 | B1 | 1/2007 | EP | 1975884 A1 | 10/2008 |
| EP | 1742170 | A1 | 1/2007 | EP | 1980868 A2 | 10/2008 |
| EP | 1145040 | B1 | 2/2007 | EP | 1118011 B1 | 11/2008 |
| EP | 1188137 | B1 | 2/2007 | EP | 1787142 B1 | 11/2008 |
| EP | 1755356 | A1 | 2/2007 | EP | 1810262 B1 | 11/2008 |
| EP | 1760486 | A2 | 3/2007 | EP | 1988365 A2 | 11/2008 |
| EP | 1763164 | A1 | 3/2007 | EP | 1992963 A2 | 11/2008 |
| EP | 1431127 | B1 | 4/2007 | EP | 1992963 A3 | 11/2008 |
| EP | 1463002 | B1 | 4/2007 | EP | 1995708 A1 | 11/2008 |
| EP | 1770642 | A2 | 4/2007 | EP | 1470392 B1 | 12/2008 |
| EP | 1770643 | A2 | 4/2007 | EP | 2000778 A2 | 12/2008 |
| EP | 1770644 | A2 | 4/2007 | EP | 2000825 A1 | 12/2008 |
| EP | 1770645 | A2 | 4/2007 | EP | 2001004 A2 | 12/2008 |
| EP | 1770646 | A2 | 4/2007 | EP | 2015102 A2 | 1/2009 |
| EP | 1361555 | B1 | 5/2007 | EP | 1658600 B1 | 2/2009 |
| EP | 1410066 | B1 | 5/2007 | EP | 2023155 A1 | 2/2009 |
| EP | 1783515 | A1 | 5/2007 | EP | 2028633 A1 | 2/2009 |
| EP | 1783720 | A1 | 5/2007 | FR | 2708349 A1 | 2/1995 |
| EP | 1785741 | A1 | 5/2007 | FR | 2715724 A1 | 8/1995 |
| EP | 1221058 | B1 | 6/2007 | FR | 2791778 A1 | 10/2000 |
| EP | 1308746 | B1 | 6/2007 | FR | 2868970 A1 | 10/2005 |
| EP | 1627371 | B1 | 6/2007 | FR | 2881841 A1 | 8/2006 |
| EP | 1798572 | A1 | 6/2007 | FR | 2916530 A1 | 11/2008 |
| EP | 1798700 | A2 | 6/2007 | JP | 9-288175 A | 11/1994 |
| EP | 1632784 | B1 | 7/2007 | JP | 6-342061 A | 12/1994 |
| EP | 1582888 | B1 | 9/2007 | JP | 8-146130 A | 5/1996 |
| EP | 1410364 | B1 | 10/2007 | JP | 9-119983 A | 11/1996 |
| EP | 1517281 | B1 | 10/2007 | WO | WO8904002 A2 | 5/1989 |
| EP | 1560186 | B1 | 10/2007 | WO | WO9205456 A1 | 4/1992 |

| | | | | | | |
|---|---|---|---|---|---|---|
| WO | WO 94/14251 | 6/1994 | | WO | WO0194971 A1 | 12/2001 |
| WO | WO9427161 A1 | 11/1994 | | WO | WO0195289 A1 | 12/2001 |
| WO | WO9428437 A1 | 12/1994 | | WO | WO0205245 A2 | 1/2002 |
| WO | WO9503598 A1 | 2/1995 | | WO | WO0205454 A2 | 1/2002 |
| WO | WO9508778 A1 | 3/1995 | | WO | WO0208784 A1 | 1/2002 |
| WO | WO9517685 A1 | 6/1995 | | WO | WO0212992 A2 | 2/2002 |
| WO | WO9521388 A1 | 8/1995 | | WO | WO0215151 A1 | 2/2002 |
| WO | WO9528650 A1 | 10/1995 | | WO | WO0223215 A1 | 3/2002 |
| WO | WO9602905 A1 | 2/1996 | | WO | WO0225307 A2 | 3/2002 |
| WO | WO9605562 A1 | 2/1996 | | WO | WO0227275 A2 | 4/2002 |
| WO | WO9616335 A1 | 5/1996 | | WO | WO0233436 A2 | 4/2002 |
| WO | WO9630779 A1 | 10/1996 | | WO | WO02052296 A2 | 7/2002 |
| WO | WO9635961 A1 | 11/1996 | | WO | WO02054103 A2 | 7/2002 |
| WO | WO9636018 A1 | 11/1996 | | WO | WO02059838 A2 | 8/2002 |
| WO | WO9636110 A1 | 11/1996 | | WO | WO02059852 A2 | 8/2002 |
| WO | WO9711421 A1 | 3/1997 | | WO | WO02066288 A1 | 8/2002 |
| WO | WO9718485 A1 | 5/1997 | | WO | WO02068991 A1 | 9/2002 |
| WO | WO9726552 A2 | 7/1997 | | WO | WO02069300 A1 | 9/2002 |
| WO | WO9732291 A1 | 9/1997 | | WO | WO02071367 A1 | 9/2002 |
| WO | WO9747173 A2 | 12/1997 | | WO | WO02075667 A1 | 9/2002 |
| WO | WO9804965 A2 | 2/1998 | | WO | WO02082121 A1 | 10/2002 |
| WO | WO9805977 A1 | 2/1998 | | WO | WO02082249 A2 | 10/2002 |
| WO | WO9814926 A1 | 4/1998 | | WO | WO02086442 A2 | 10/2002 |
| WO | WO9822834 A1 | 5/1998 | | WO | WO02091312 A2 | 11/2002 |
| WO | WO9822923 A1 | 5/1998 | | WO | WO02095709 A1 | 11/2002 |
| WO | WO9832028 A1 | 7/1998 | | WO | WO02095712 A2 | 11/2002 |
| WO | WO9835311 A1 | 8/1998 | | WO | WO 02/099769 | 12/2002 |
| WO | WO9843107 A1 | 10/1998 | | WO | WO02097762 A1 | 12/2002 |
| WO | WO9847024 A2 | 10/1998 | | WO | WO02099769 A1 | 12/2002 |
| WO | WO9849654 A1 | 11/1998 | | WO | WO02101409 A2 | 12/2002 |
| WO | WO9857190 A1 | 12/1998 | | WO | WO03005326 A1 | 1/2003 |
| WO | WO9857193 A1 | 12/1998 | | WO | WO03009255 A1 | 1/2003 |
| WO | WO9901780 A1 | 1/1999 | | WO | WO03009613 A1 | 1/2003 |
| WO | WO9908251 A1 | 2/1999 | | WO | WO03013010 A1 | 2/2003 |
| WO | WO9917134 A1 | 4/1999 | | WO | WO03016937 A1 | 2/2003 |
| WO | WO9928760 A1 | 6/1999 | | WO | WO03023439 A2 | 3/2003 |
| WO | WO9928761 A1 | 6/1999 | | WO | WO03025884 A1 | 3/2003 |
| WO | WO9935630 A1 | 7/1999 | | WO | WO03027934 A1 | 4/2003 |
| WO | WO9942855 A1 | 8/1999 | | WO | WO03028278 A1 | 4/2003 |
| WO | WO9945519 A2 | 9/1999 | | WO | WO03032525 A1 | 4/2003 |
| WO | WO 99/50985 | 10/1999 | | WO | WO03044561 A1 | 5/2003 |
| WO | WO9956144 A1 | 11/1999 | | WO | WO03054830 A2 | 7/2003 |
| WO | WO0007404 A1 | 2/2000 | | WO | WO03056495 A1 | 7/2003 |
| WO | WO0022595 A1 | 4/2000 | | WO | WO03060854 A1 | 7/2003 |
| WO | WO0023816 A1 | 4/2000 | | WO | WO03060855 A1 | 7/2003 |
| WO | WO0039775 A2 | 7/2000 | | WO | WO03067281 A1 | 8/2003 |
| WO | WO0041000 A1 | 7/2000 | | WO | WO03069576 A1 | 8/2003 |
| WO | WO0041153 A1 | 7/2000 | | WO | WO03079136 A2 | 9/2003 |
| WO | WO0041154 A1 | 7/2000 | | WO | WO03081560 A1 | 10/2003 |
| WO | WO0046068 A1 | 8/2000 | | WO | WO03090493 A1 | 10/2003 |
| WO | WO0048015 A1 | 8/2000 | | WO | WO03093775 A2 | 11/2003 |
| WO | WO0049423 A2 | 8/2000 | | WO | WO03096282 A1 | 11/2003 |
| WO | WO0057204 A2 | 9/2000 | | WO | WO03098152 A1 | 11/2003 |
| WO | WO0062234 A1 | 10/2000 | | WO | WO03098576 A1 | 11/2003 |
| WO | WO0065373 A2 | 11/2000 | | WO | WO03104834 A2 | 12/2003 |
| WO | WO0070363 A1 | 11/2000 | | WO | WO03107299 A2 | 12/2003 |
| WO | WO0070581 A2 | 11/2000 | | WO | WO2004008415 A1 | 1/2004 |
| WO | WO0108122 A1 | 2/2001 | | WO | WO2004023426 A1 | 3/2004 |
| WO | WO0109638 A1 | 2/2001 | | WO | WO2004029902 A1 | 4/2004 |
| WO | WO0111389 A1 | 2/2001 | | WO | WO2004042418 A1 | 5/2004 |
| WO | WO0120260 A1 | 3/2001 | | WO | WO2004068162 A2 | 8/2004 |
| WO | WO0127650 A1 | 4/2001 | | WO | WO2004109317 A2 | 12/2004 |
| WO | WO0133302 A2 | 5/2001 | | WO | WO2004114250 A1 | 12/2004 |
| WO | WO0146886 A2 | 6/2001 | | WO | WO2004114252 A1 | 12/2004 |
| WO | WO0146934 A1 | 6/2001 | | WO | WO2005003812 A1 | 1/2005 |
| WO | WO0148506 A2 | 7/2001 | | WO | WO2005010553 A1 | 2/2005 |
| WO | WO0148652 A1 | 7/2001 | | WO | WO2005011131 A1 | 2/2005 |
| WO | WO0152218 A1 | 7/2001 | | WO | WO2005017555 A2 | 2/2005 |
| WO | WO0155993 A1 | 8/2001 | | WO | WO2005038478 A2 | 4/2005 |
| WO | WO0157550 A1 | 8/2001 | | WO | WO2005038485 A1 | 4/2005 |
| WO | WO0159601 A1 | 8/2001 | | WO | WO2005040852 A1 | 5/2005 |
| WO | WO0163239 A1 | 8/2001 | | WO | WO2005052887 A1 | 6/2005 |
| WO | WO0165276 A1 | 9/2001 | | WO | WO2005069250 A1 | 7/2005 |
| WO | WO0177704 A2 | 10/2001 | | WO | WO2005081012 A1 | 9/2005 |
| WO | WO0184080 A1 | 11/2001 | | WO | WO2005081630 A2 | 9/2005 |
| WO | WO0186229 A2 | 11/2001 | | WO | WO2005083642 A1 | 9/2005 |
| WO | WO 0186319 | 11/2001 | | WO | WO2005086113 A1 | 9/2005 |
| WO | WO0186319 A2 | 11/2001 | | WO | WO2005111654 A1 | 11/2005 |
| WO | WO0194969 A2 | 12/2001 | | WO | WO2005114613 A1 | 12/2005 |

| | | |
|---|---|---|
| WO | WO2005119288 A2 | 12/2005 |
| WO | WO2005121701 A2 | 12/2005 |
| WO | WO2006019422 A2 | 2/2006 |
| WO | WO2006027557 A1 | 3/2006 |
| WO | WO2006027762 A1 | 3/2006 |
| WO | WO2006036482 A2 | 4/2006 |
| WO | WO2006039445 A1 | 4/2006 |
| WO | WO2006040730 A2 | 4/2006 |
| WO | WO2006048674 A1 | 5/2006 |
| WO | WO2006059155 A1 | 6/2006 |
| WO | WO2006070207 A1 | 7/2006 |
| WO | WO2006079165 A1 | 8/2006 |
| WO | WO2006088554 A1 | 8/2006 |
| WO | WO2006093682 A2 | 9/2006 |
| WO | WO2006101763 A1 | 9/2006 |
| WO | WO2006108275 A1 | 10/2006 |
| WO | WO2006110973 A1 | 10/2006 |
| WO | WO2006124327 A2 | 11/2006 |
| WO | WO2006130155 A2 | 12/2006 |
| WO | WO2006135916 A1 | 12/2006 |
| WO | WO2006135923 A2 | 12/2006 |
| WO | WO2006137871 A2 | 12/2006 |
| WO | WO2007001660 A2 | 1/2007 |
| WO | WO2007003455 A1 | 1/2007 |
| WO | WO2007010116 A1 | 1/2007 |
| WO | WO2007012888 A1 | 2/2007 |
| WO | WO2007013069 A1 | 2/2007 |
| WO | WO2007022418 A2 | 2/2007 |
| WO | WO2007048237 A1 | 5/2007 |
| WO | WO2007063070 A1 | 6/2007 |
| WO | WO2007063126 A1 | 6/2007 |
| WO | WO2007067914 A2 | 6/2007 |
| WO | WO2007072015 A2 | 6/2007 |
| WO | WO2007072028 A2 | 6/2007 |
| WO | WO2007086899 A2 | 8/2007 |
| WO | WO2007113469 A1 | 10/2007 |
| WO | WO2007115246 A1 | 10/2007 |
| WO | WO2007120588 A2 | 10/2007 |
| WO | WO2007124300 A2 | 11/2007 |
| WO | WO2007143238 A2 | 12/2007 |
| WO | WO2007149114 A2 | 12/2007 |
| WO | WO2008001117 A1 | 1/2008 |
| WO | WO2008005012 A1 | 1/2008 |
| WO | WO2008012377 A1 | 1/2008 |
| WO | WO2008018088 A1 | 2/2008 |
| WO | WO2008035981 A2 | 3/2008 |
| WO | WO2008045134 A2 | 4/2008 |
| WO | WO2008051292 A2 | 5/2008 |
| WO | WO2008053173 A1 | 5/2008 |
| WO | WO2008054507 A2 | 5/2008 |
| WO | WO2008064490 A1 | 6/2008 |
| WO | WO2008065328 A2 | 6/2008 |
| WO | WO2008065658 A1 | 6/2008 |
| WO | WO2008067306 A2 | 6/2008 |
| WO | WO2008068679 A1 | 6/2008 |
| WO | WO2008073706 A1 | 6/2008 |
| WO | WO2008076177 A2 | 6/2008 |
| WO | WO2008085443 A2 | 7/2008 |
| WO | WO2008093036 A2 | 8/2008 |
| WO | WO2008108823 A2 | 9/2008 |
| WO | WO2008110928 A2 | 9/2008 |
| WO | WO2008116580 A1 | 10/2008 |
| WO | WO2008126126 A2 | 10/2008 |
| WO | WO2008127477 A2 | 10/2008 |
| WO | WO2008130948 A1 | 10/2008 |
| WO | WO2008144784 A1 | 12/2008 |
| WO | WO2008145986 A2 | 12/2008 |
| WO | WO2009001294 A2 | 12/2008 |
| WO | WO2009004381 A1 | 1/2009 |

OTHER PUBLICATIONS

GPS Relative Accuracy for Collision Avoidance, Institute of Navigation Technical Meeting, Jan. 1997 (Rudel et al.).

Cassell, R., Smith A., Cohen, B., Yang, E., Sleep, B., A Prototype Aircraft Performance Risk Assessment Model, Final Report, Rannoch Corporation, Feb. 28, 2002.

Cassell, R., Smith A., Cohen, B., Yang, E., Sleep, B., Esche, J., Aircraft Performance Risk Assessment Model (APRAM), Rannoch Corporation, Nov. 30, 2002.

Cox, E., A., Fuzzy Logic for Business and Industry, Charles River Media, 1995, Chapter 5.

Smith, A., Cassell, R., Cohen, B., An approach to Aircraft Performance Risk Assessment Modeling, Final Report, Rannoch Corporation, Mar. 1999.

M.L. Wood and R. W. Bush, "Multilateration on Mode S and ATCRBS Signals at Atlanta's Hartsfield Airport", Lincoln Laboratory, M.I.T., Jan. 8, 1998.

AERMOD: Description of Model Formulation (Version 02222) EPA 454/R-02-002d, Oct. 21, 2002.

FAA Integrated Noise Model, www.faa.gov, current release INM 6.1 (Mar. 4, 2003).

"Flight Explorer News: Flight Explorer and Lochard Team to Provide Enhanced Flight Tracking for Cutomers Worldwide", Apr. 28, 2003, http://www.flightexplorer/com/News/press%20releases/pr042803. asp.

Source Code received by Rannoch Corp. from FAA, circa 1998.

"A Routine that converts an American Mode S address into its corresponding 'N' number string", Ken Banis, Feb. 17, 1992/.

"Description of the U.S. Algorithm for Assigning Mode A Addresses", Robert D. Grappel, M.I.T. Lincoln Laboratory, Nov. 1991.

"Program to convert Mode S address to U.S. Tail Number", R.D. Grappel, M.I.T. Lincoln Laboratory, 1991.

"Program to convert U.S. aircraft tail numbers to Mode S code", R.D. Grappel, M.I.T. Lincoln Laboratory, 1991.

"ADSE and Multilateration Mode-S Data Fusion for Location and Identification on Airport Surface", J.G. Herraro J.A. Portas, F.J. Rodriguez,(*IEEE 1999 Radar Conference Proceedings*, pp. 315-320, Apr. 20-22, 1999).

D.C. Rickard, D.J.Sherry, S.J.Taylor, "The development of a prototype aircraft-height monitoring unit utilising an SSR-based difference in time of arrival technique", International Conference Radar 92 (Conf. Publ. No. 365), 1992, p. 250-253.

D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.

Request for Proposal for Acquisition of Airport Noise and Operations Monitoring System (NOMS), Indianapolis Airport Authority, Oct. 21, 2003.

Technical Specifications, for Aircraft Flight Track and Noise Management System for the Regional Airport Authority of Louisville and Jefferson County, Harris Miller, Miller & Hanson Inc. 15 New England Executive Park Burlington, MA 01803 HMMH Report No. 298950, May 16, 2003.

"Overview of the FAA ADS-B Link Decision", John Scardina, Director, Office of System Architecture and Investment Analysis, Federal Aviation Administration, Jun. 7, 2002.

"Ground-Based Transceiver (GBT) For Broadcast Services Using the Universal Access Transceiver (UAT) Data Link", FAA-E-2973, Department of Transportation, Federal Aviation Administration, Jan. 15, 2004.

"Wide Area Multilateration Report on EATMP TRS 131/04 Version 1.1", NLR-CR-2004-472, Roke Manor, Nov. 2004.

J.G. Herrero, J. A. B. Portas, F.J.J. Rodriguez, J.R.C. Corredera, ASDE and Multilateration Mode-S Data Fusion for Location and Identification on Airport Surface, (*IEEE 1999 Radar Conf. Proc.*, pp. 315-320, Apr. 20-22, 1999).

D.C. Rickard, D.J. Sherry, S.J. Taylor, The development of a prototype aircraft-height monitoring unit utilizing an SSR-based difference in time of arrival technique, Int'l Conference Radar 92 (Conf. Publ. No. 365), 1992, p. 250-253.

D. E. Manolakis and C. C. Lefas, Aircraft geometric height computation using secondary surveillance radar range differences, IEE Proceedings-F, Radar, Sonar, Navigation, vol. 141, No. 2, pp. 139-148, 1994.

GPS Risk Assessment Study, Final Report, T.M. Corrigan et al., Johns Hopkins Univ., Applied Physics Laboratory, Jan. 1999.

Aircraft Noise Report, vol. 17, No. 1, Jan. 31, 2005.

ASA MASPS—Change Issue, James Maynard, Oct. 21, 2002.

ADS-B, Automatic Dependent Surveillance—Broadcast Will ADS-B Increase Safety and Security for Aviation?, Mar. 1999, revised Jul. 2000, Darryl H. Phillips AirSport Corporation, 1100 West Cherokee Sallisaw OK 74955.
ASA MASPS—Change Issue, Greg Stayton, Aug. 1, 2002.
ASA MASPS—Change Issue, Michael Petri, Oct. 23, 2002.
ASA MASPS—Change Issue, J. Stuart Searight, Nov. 18, 2002.
ASA MASPS—Change Issue, Michael Petri, Dec. 16, 2002.
ASA MASPS—Change Issue, J. Stuart Searight, Jan. 23, 2003.
ASA MASPS—Change Issue, Tony Warren, Feb. 3, 2003.
ASA MASPS—Change Issue, Steve George, Apr. 23, 2003.
ASA MASPS—Change Issue, James Maynard, Apr. 23, 2003.
ASA MASPS—Change Issue, T.E. Foster, Jun. 11, 2003.
ASA MASPS—Change Issue, Jonathan Hammer et al., Jan. 13, 2004.
ASA MASPS—Change Issue, Tom Mosher, Jan. 13, 2004.
ASA MASPS—Change Issue, Mike Castle, Feb. 13, 2004.
ASA MASPS—Change Issue, Tony Warren, Sep. 10, 2004.
ASA MASPS—Change Issue, Mike Castle, Sep. 10, 2004.
ASA MASPS—Change Issue, Bob Smith, Sep. 1, 2004.
ASA MASPS—Change Issue, Heleberg and Kaliardos, Oct. 15, 2004.
ASA MASPS—Change Issue, Taji Shafaat, Sep. 19, 2004.
ASA MASPS—Change Issue, Stuart Searight, Nov. 3, 2004.
A Radar Substitute—David Hughes, Aviation Week & Space Technology, Mar. 7, 2005.
Statement of ACI-NA and AAAE on Airport Improvement Program Reauthorization before the Senate Aviation Subcommittee on Feb. 12, 1998. David Plavin.
Draft Proposal for the Amendment of the Sub-Cap on Off-Peak Takeoff and Landing Charges at Dublin Airport, Commission for Aviation Regulation, Nov. 23, 2003.
Aviation Infrastructure: Challenges Associated with Building and Maintaining Runways, General Accounting Office, GAO-01-90-T, Oct. 5, 2000.
Airfield Pavement: Keeping Nations Runways in Good Condition Could Require Substantially higher Spending, GAO/RCED-98-226, Jul. 1998.
Albany International Airport Pavement Management System, Albany, New York, Albany International Airport GIS-Based Pavement and Facilities Management, Fall, 2002.
Albany International Airport, New York, Uses GIS for Pavement Management, Lena Weber, Ph.D., GIS Manager, and Pat Rooney, GIS/GPS Technician, C.T. Male Associates, Summer, 2002, http://www.esri.com/news/arcnews/summer02articles/albany-airport.html.
Micropaver, Dr. M.Y. Shahin, CECER-CFF Champaign, IL May 2, 2005.
Raytheon Systems Limited Launches a Unique Solution for ADS-B,. Jan. 19, 2005, Raytheon Corp. http://www.raytheon.co.uk/highlights/ATMS.html.
Raytheon Systems Limited's ADS-B Solution Prized by International Air Traffic Authorities, Feb. 2, 2005, http://www.raytheon.co.uk/news_room/news/press_02022005.pdf.
Boeing Subsidiary and Megadata Announce Joint Marketing Agreement, Press Release, Aug. 7, 2003.
Federal Airways & Airspace, Inc. Because Accuracy Matters, Feb. 2003, Jan. 2002.
VDL4 TM Alignment With DO-242A (RTCA ADS-B MASPS) WG51/SG2, NASA, Sep. 2003.
Method to Provide System-Wide ADS-B Back-Up, Validation, and Security, A. Smith et al. 25th AIAA/IEEE Digital Avionics Systems Conference, Oct. 15, 2006.
*Positive Identification of Aircraft on Surface Movement Area—Results of FAA Trials*, 10th Annual International AeroSense Symposium, Orlando, Florida, Apr. 1996.
*Surveillance Monitoring of Parallel Precision Approaches in a Free Flight Environment*, AIAA 16th Annual Digital Avionics Systems Conference, Oct. 1997.
*Analysis of ADS-B, ASDE-3 and Multilateration Surveillance Performance*—NASA Atlanta Demonstration Presented at the AIAA 17th Annual Digital Avionics Systems Conference in Oct. 1998.

*Application of ADS-B for Airport Surface Surveillance*, Daniel Hicok, Derrick Lee IEEE AIAA 17th Annual Digital Avionics Conference, 1998.
*Atlanta Hartsfield International Airport—Results of FAA Trials to Accurately Locate/Identify Aircraft on the Airport Movement Area*, IEEE Plans, Atlanta, GA, Apr. 1996.
*Evaluation of Airport Surface Surveillance Technologies*, IEEE Radar 96 conference, Beijing, China, Oct. 1996.
*Improved Location/Identification of Aircraft/Ground Vehicles on Airport Movement Areas—Results of FAA Trials*, Institute of Navigation in Santa Monica, CA, Jan. 1996.
*Sensis News*, http://www.sensis.com/docs/128/ © 1999-2006.
*Roke RADAR, Design and development of miniature radars and fuze sensors through to major radar programme builds*, http://www.roke.co.uk/skills/radar/, © 2006.
*Acoustic System for Aircraft Detection and Tracking, based on Passive Microphone Arrays*. Caronna, Rosello, Testa, 148th Meeting of the Acoustical Society of America, http://pcfite.ing.uniroma1.it/upload/research/4psp71107948 2021710.pdf Nov. 2004.
*Cel-Loc How We Do it, Technology Overview*, http://www.cell-loc.com/how_tech.html, Oct. 2, 2006 (original date unknown).
*Super-Radar, Done Dirt Cheap*, http://www.businessweek.com/magazine/content/03_42/b3854113.htm BusinessWeek Online, Oct. 20, 2003.
*Methods to Provide System-Wide ADS-B Back-Up, Validation and Security*, A. Smith, R. Cassell, T. Breen, R. Hulstrom, C. Evers, 25th AIAA/IEEE Digital Avionics Systems Conference, Oct. 15, 2006.
Damarel Systems International, Ltd, Travel Automation Specialists, © 2004, www.dameral.com.
Airfield Pavement Computer Software, Mar. 23, 2005, Transport Canada https://www.tc.gc.ca/CivilAviation/International/Technical/Pavement/software.htm.
ARA Transportation, © 2004, http://www.araworldwide.com/expertise/industry/transportation.htm.
*The Twilight Zone, Can Wide-Area Multilateration Systems Become A Nightmare for MSSR Producers*? Aircraft Traffic Technology International 2005, Vladimir Manda, Viktor Sotona.
*Safety, Performance, and Interoperability Requirements Document for ADS-B NRA Application*, European Organisation for Civil Avaiation Equipment, Dec. 2005.
Passive Surveillance Using Multilateration, Roke Manor Research website (2003).
Letter from Marc Morgan, SIEMENS, Feb. 10, 2006.
*Required Navigation Performance (RNP) and Area Navigation (RNAV)*, Boeing, Aug. 2000.
*System-Wide ADS-B Back-Up and Validation*, A. Smith, R. Cassell, T. Breen, R. Hulstrom, C. Evers, 2006 Integrated Communications, Navigation, and Surveillance Conference.
Required Navigation Performance (RNP) Another step towards global implementation of CNS/ATM, Anita Trotter-Cox, Assessment Compliance Group, Inc. Published in Professional Pilot Magazine, Jun. 1999.
Airport Pavement Management Systems: An Appraisal of Erxisting Methodologies, Michel Gendreau and Patrrick Soriano;Pergamon Transn Res. A, vol. 32, No. 3, pp. 187-214, 1998.
*Components of a Pavement Maintenance Management System*, Mohamed Y. Shahin, U.S. Army Construction Engineering Research Laboratory, Transportaiton Research Record 791, pp. 31-39, 1980.
*Application of Markov Process to Pavement Management Systems at the Network Level*, Abbas Ahmad Butt, University of Iillinois at Urbana-Champaign (1991).
Need for Accurate Traffic Data in Pavement Management, John F. Kennedy International Airport Case Studt, Keegan, Handojo, Rada, MACTEX Engineering and Consulting, Inc, 2004 FAA Worldwide Airport Technology Transfer Conference, Apr. 2004.
PCL system with illuminator of opportunity, Huaiying tan, Min ren, Bo lie, Jinning Song, Beijing Radar Instiitute, IEEE 0-7803-9582-4/06, Apr. 2006.
High Accurate Multiple Target Detection in PCL Radar Systems; Jafargholi, A. Mousavi, M. R. Nayebi, M. M. K. N. Toosi University of Technology Department of Electrical Engineering, Tehran, Iran; Radar, 2006. CIE '06. International Conference on, Oct. 2006, Shanghai, China; ISBN: 0-7803-9583-2.

Denial of bistatic hosting by spatial-temporal waveform design; H.D. Griffiths, M.C. Wicks, D. Weinder, R. Adve, P.A. Antonik, and I. Fotinopoulos, IEE Proc. Radar Sonar Navig., vol. 152, No. 2, Apr. 2005.

Passive coherent location FPGA implementation of the cross ambiguity function; Kvasnicka, M. Hermanek, A. Kunes, M. Pelant, M. Plsek, R., Proceedings- SPIE The International Society for Optical Engineering; 2006, vol. 6159; Part 1, pp. 615918; International Society for Optical Engineering.

Passive coherent location system simulation and evaluation, Proc. SPIE, vol. 6159, 615917 (2006); DOI:10.1117/12.675065 , Apr. 26, 2006 ; Conference Title: Photonics Applications in Astronomy, Communications, Industry, and High-Energy Physics Experiments IV Libor Slezák, Michael Kvasnicka, Martin Pelant, and Jit Vavra *ERA a.s. (Czech Republic)* Radek Plsek *Technical Univ. of Pardubice (Czech Republic)*.

World Airport Week, "Sharing Makes the Airport Go Round" Jan. 21, 1997, p. 1.

Huaiying Tan et al. *PCL System With Illuminator of Opportunity* Proceedings of 2006 CIE International Conference on Radar, vol. 1,Oct. 16, 2006.

Griffiths H D et al., *Denial of Bistatic Hosting by Spatial-Temporal Waveform Design* IEE Proceedings: Radar, Sonar & Navigation, Institution of Electrical Engineers, GB, vol. 152, No. 2, Apr. 8, 2005.

Jafargholi et al, *High Accurate Multiple Target Detection in PCL Radar Systems*, RADAR, 2006, CIE '06. International Conference on, IEEE, PI, Oct. 1, 2006.

Terminal, Landing Fees Increase, Dianne Gouliquer, Northern Ontario Business, Sudbury, Apr. 1, 2001, vol. 21, Issue 6, p. 24.

Conflict Detection and Resolution for Future Air Transport Management, Jimmy Krozel, Ph.D, Mark E. Peters, and George Hunter, TR 97138-01, NASA Ames Research Center, Contract NAS2-14285, Apr. 1997.

ADS-X—Next Generation Surveillance Solutions, Alex Smith, Russell Hulstron, Rannoch Corporation, ATCA Oct. 2006.

Transtech Airport Solutions, Inc., http://www.transtech-solutions.com/products/asm/airport.html, Feb. 12, 2009.

Eurocontrol Standard Document for Surveillance Interchange Part 14: Category 020, Multilateration Target Reports, SUR.ET1.ST05.2000-STD-14-02, Apr. 2008.

ATO Advanced Technology Development and Prototyping Group, http://222.faa.gov/about/office_org/headquarters_offices/ato/service_units/operations/td/.. Jan. 16, 2008.

Form B- Proposal Summary, NASA SBIR 02-1 Solicitation, http://sbir.nasa.gov/SBIR/abstracts/02/sbir/phase1/SBIR-02-1-A3.01-9714.html Sep. 5, 2002.

Form 9B—Project Summary, NASA SBIR 00-1 Soliciation http://sbir.nasa.gov/SBIR/abstracts/00/sbir/phase1/SBIR-00-1-04.01-9704.html Feb. 12, 2009.

NASA 1998 SBIR Phase 1, Proposal No. 91-1 01.02.9780B (1998) http://sbir.nasa.gov/SBIR/abstracts/98/sbir/phase1/SBIR-98-1-01.02-9780B.html.

Protest Letter dated May 16, 2002 from Otto M. Wildensteiner, U.S. Department of Transportation, Washington, DC.

"Comparison of Claims in U.S. Appl. No. 09/971,672 with Prior Art", May 16, 2002, Otto M. Wildensteiner, Department of Transportation, Washington, DC.

"Minimum Aviation System Performance Standards for Automatic Dependent Surveillance Broadcast (ADS-B)", RCTA, Inc. Washington, DC, 81998.

"Runway Incursion Reduction Program Dallas-Ft. Worth Formal Evaluation Report, Final Report", Trios Associates, Inc. Dec. 21, 2000.

"TIS-B DFW Application for Airport Surface Situational Awareness", Trios Associates, Inc., Sep. 6, 2000.

"A Prototype Transceiver for Evaluating An Integrated Broadcast Data Link Architecture", Chris Moody & Warrent Wilson, RCTA SC-186, Aug. 17, 1995, RTCA Paper No. 449-95/SC186-033.

"The Universal Access Transceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND-410) Sep. 4, 1998.

"Phase I—Operational Evaluation Final Report Cargo Airline Association ADS-B Program, FAA SafeFlight 21 Program" Apr. 10, 2000.

"Capstone Program Plan Version 1.0", Federal Aviation Administration, Mar. 10, 1999.

"TIS-B Concept and Approach", MITRE, Chris Moody, Feb. 29, 2000.

"RTCA Special Committee 186, Working Group 5 ADS-B UAT MOPS Meeting #2, Proposed Contents and Transmission Rates for ADS-B Messages" Chris Moody, MITRE Corp., Feb. 20, 2001.

"Airborne Information Initiatives: Capitalizing on a Multi-Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.

"Minutes of SC-186 WG-2 (TIS-B) Meeting", Jun. 13-14, 2000.

"UK ADS-B in radar environment" (Mark Watson) http://www.eurocontrol.int/cascade/gallery/content/public/documents/Presentations/Session%20%202%20-%20Trials%20and%20Implementations/Watson%20-%20UK%20ADS-B%20in%20a%20radar%20environment.pdf (2006).

Ground Vehicle Operations on Airports, FAA Advisory Circular AC No. 150/5210-20 Jun. 21, 2002.

AIRCRAFT TRACKING USING LOW COST TAGGING AS A DISCRIMINATOR

CROSS-REFERENCE TO RELATED APPLICATIONS

The present application is a Continuation-In-Part of U.S. patent application Ser. No. 11/541,480 filed on Sep. 29, 2006, and incorporated herein by reference; application Ser. No. 11/541,480 is in turn a Continuation-In-Part of U.S. patent application Ser. No. 11/429,926, filed on May 8, 2006, now U.S. Pat. No. 7,477,193, also incorporated herein by reference.

FIELD OF THE INVENTION

The present invention relates to aircraft tracking. In particular, the present invention is directed toward a system and method for providing tagging data for aircraft tracking systems.

BACKGROUND OF THE INVENTION

The National Airspace System (NAS) provides minimal surface surveillance at small to medium airports. The view of the air traffic controller out the window and voice communication with pilots are the primary means of avoiding conflicts and maintaining operational capacity and safety. If visibility is reduced due to weather conditions, then capacity and safety may be severely restricted without some means of surface surveillance.

To improve safety at small to medium-sized airports, the Federal Aviation Administration Air Traffic Organization (ATO, See, www.ato.faa.gov) Advanced Technology Development and Prototyping Group is proposing a Low Cost Ground Surveillance (LCGS) system be developed and implemented.

This LCGS concept provides scalable and adaptable coverage from user-specified regions to an entire airport movement area. Two different LCGS candidates are under evaluation: the Critical Area Management System (CAMS) and the NOVA 9000 Air Traffic Control System (ATCS). See: http://www.faa.gov/about/office_org/headquarters_offices/ato/service_units/operations/td/projects/lcgs/, incorporated herein by reference.

CAMS, from Transtech Airport Solutions, Inc. (http://www.transtech-solutions.com/products/asm/airport.html) uses an array of millimeter wave sensors (MWS) distributed throughout the airport movement area to provide coverage of runways, taxiways, and ramp areas. MWS requires no aircraft-installed equipment to operate. The current system installed at Spokane International Airport (GEG), as part of the LCGS evaluation, is integrated with ARTS-IIE. This system can also be integrated with an Optical Identification Sensor (OIS) currently under evaluation.

The NOVA 9000 Air Traffic Control System (ATCS) from Park Air Systems of Horten, Norway, uses Terma X-Band radar to provide complete coverage of the airport movement area. It requires no aircraft-installed equipment to operate. The current system installed at GEG is also integrated with ARTS-IIE.

Both the CAMS and NOVA systems do not require the use of special equipment in the aircraft, making them well-suited for smaller airport use, where aircraft may only have simple radios and transponders. However, both systems rely upon radars and radar type devices, which may be prone to shading and dead spots in coverage. Moreover, such radar transmitters may be expensive to install, and may require FCC approval and/or may interfere with other radars and radio signals. In addition, while such systems may be able to track aircraft and objects, if they cannot read transponder data from aircraft, they cannot identify aircraft individually (e.g., by registration or flight number)

Evers, U.S. Pat. No. 6,211,811, issued Apr. 3, 2001, and incorporated herein by reference, discloses a method and apparatus for improving the surveillance coverage and target identification in a radar based surveillance system. The Evers '811 patent is assigned to the same assignee as the present application and names an inventor in common.

The surveillance of the Evers '811 patent provides a means to measure Time Difference of Arrival (TDOA) and decode identification of signal source transmissions. TDOA and identification information received from a minimum of two receiving means is used to supplement non-cooperative surveillance systems (e.g., primary radar, acoustic sensors) with target identification. The system uses a Line Of Position technique to determine position. The system can be implemented as a standalone multilateration surveillance system, which provides signal source position determination when reception is available from a minimum of two receiving means. The system provides position aiding when implemented to supplement non-cooperative surveillance systems.

Standalone multilateration systems do not require the use of radio transmitters or radar transmitters in order to track aircraft and other vehicles. Rather, using a plurality of radio receivers, it is possible to track aircraft using aircraft signals ordinarily generated from the aircraft—e.g., transponder signals, radio signals, and the like. From these signals, one can track the position of the aircraft and identify the aircraft as well. However, for smaller aircraft, such transponder signals may only be generated in response to an interrogation signal from a conventional ATC radar. A passive multilateration system may not interrogate aircraft transponders to generate aircraft signal data.

Multilateration systems may also be used in conjunction with radar systems to provide redundant tracking data, to confirm radar data and serve as backup if radar should fail or a vehicle or aircraft is in an area of no radar coverage. In addition, data from a multilateration system may be fused with radar data to provide an enhanced data stream of robust and redundant tracking and identification data.

Different types of data signals may be generated by aircraft for various tracking and collision avoidance systems. The Mode S Transponder has the ability to utilize many different formats to communicate air-to-air and air-to-ground. These formats are separated into "short" messages (56 bits long) and "long" messages (112 bits long). A "UF" message is from the interrogator (can be a ground station or a TCAS—Traffic Collision Avoidance System) to the Mode S transponder.

Level 1 is the minimum Mode S Transponder. It has the ability to reply to Mode S interrogations, but it does not have any datalink capability. The message formats used by a Level 1 transponder are all short (56 bit) messages and may include UF messages, which are interrogations to the Transponder. UF messages may include: UF 0—Short Special Surveillance; UF 4—Surveillance, Altitude Request; UF 5—Surveillance, Identity Request; and UF 11—Mode S Only All Call. A "DF" message is a reply from the Mode S transponder to the interrogator, and may include: DF 0—Short Special Surveillance; DF 4—Surveillance, Altitude Reply; DF-5 Surveillance, Identity Reply; and DF 11—All Call Reply.

Rannoch Corporation, predecessor to ERA Systems, Inc, assignee of the present invention, worked with NASA on a Small Business Innovation Research project, proposal number 98-1 01.02-9780B entitled "Low-cost Aircraft Identification and Surveillance System" incorporated herein by reference.

That system provided a low-cost (i.e., under $300K) 1090 MHz Multilateration/Line of Position (LOP)/Automatic Dependent Surveillance-Broadcast (ADS-B) surface surveillance system, which uses the following cost-saving technology innovations: a two-receiver identification/position determination algorithm, GPS synchronization, and passive Mode A/C multilateration. The system addressed FAA Topic 01 Aviation Safety & Capacity, Subtopic 01.02 Advanced Concepts in Air Traffic Management, by providing low-cost surveillance technology, which can be used to locate and identify traffic operating on the airport surface. This surveillance enhances safety by enabling Air Traffic Control (ATC) to have a situational display of traffic movement, as well as automatic runway incursion detection alerting. The system may be used as an enhancement to primary surface radar (i.e., Airport Surface Detection Equipment or ASDE-3) by providing identification of aircraft targets and providing surveillance position aiding in regions where the radar does not provide reliable coverage. Another application of the system is standalone aircraft surveillance; a low-cost standalone system is needed at airports that have not qualified for any currently fielded surveillance system due to cost-benefits ratio analyses.

The multilateration/LOP/ADS-B surface surveillance system has a number of commercial applications: (1) Airport surface surveillance to support runway incursion detection; (2) Airport surface surveillance to support traffic automation for FAA systems such as Surface Movement Advisor; (3) Airport surface surveillance to support NASA's Dynamic Runway Occupancy Monitoring system; (4) Terminal area surveillance to support Precision Runway Monitoring; and (5) Terminal area surveillance to provide surveillance of ADS-B-equipped aircraft.

SUMMARY OF THE INVENTION

A need exists in the art to perform low-cost tagging for surface surveillance systems that have Surface Movement Radar and Data Fusion/ATC Displays. The technique of the present invention may be used as a discriminator for follow-on improvements to the FAA Low-Cost Ground Surveillance Program.

In the present invention, a single Receive/Transmit (R/T) station automatically tags targets with the help of Surface Movement Radar (SMR). The present invention may be applied as a component of the FAA Low-Cost Ground Surveillance Program, as well as a stand-alone product.

In one embodiment of the present invention, a very stripped down unilateration version of ERA's Multilateration and ADS-B Surveillance System (MSS, see, http://www.sra.com/media/era/mss-by-era.pdf, incorporated herein by reference) is used, to perform tagging for the FAA Low Cost Ground Surveillance program. The cost of such a system may be less than $200,000, making it affordable for small to medium-sized airports. This system may also be used as the foundation for a full MSS system, if a customer wants to upgrade to a multilateration system.

The system of the present invention acquires and periodically updates identification of aircraft that are being tracked by Surface Movement Radar (SMR). Currently, no company makes a system to do this. There are a number of benefits to such a system. First, the system provides identification of ground targets to Air Traffic Control (ATC), which is very important, in terms of safety, workload and reduced communications benefits. Identification of ground targets can be achieved using a full Multilateration (MLAT) system, but such a solution may be too costly for many FAA LCGS airports. Second, a low-cost tagging system may provide a good discriminator for follow-on LCGS systems.

The aforementioned Rannoch NASA SBIR demonstrated tagging was feasible. That system, however used two 1090 MHz receivers, instead of a receiver/interrogator as in the present invention. A receiver/interrogator represents an improvement over the earlier system, as it allows the system to interrogate for Mode A identification. Data from a Surface Movement Radar (SMR) and a prototype MLAT system installed in at Hartsfield-Jackson Atlanta Airport (ATL) has been used to demonstrate the present invention. This test showed that it was feasible to use only two receiver sensors to get reliable tagging. Whether two receivers or a receiver/interrogator is used, the tagging technique is similar. When altitude is known, the system determines the Line-of-Position (LOP) of the aircraft transponder. LOP is either a hyperbola or an ellipse or a circle depending on how the system is configured.

All technologies have their limitations, and there are instances where the system cannot resolve identification, but this is only for short periods of time. However, as long as the SMR does not drop track, the system can maintain identification on the SMR targets.

The present invention builds upon the method set forth in the aforementioned Evers '811 patent, so this class of analysis (SMR to multilateration data mapping) has already been proven. Two main difference between the present invention and the technique in the Evers '8aa patent are: (1) the present invention uses just one active transmitter/receiver unit as opposed to multiple passive receivers, (2) the present invention captures the aforementioned UF 5 and DF 5 data, thus providing Mode A identification, which then acts as the key to obtaining the call sign from a data fusion packages—thus making it an affordable and marketable product for small to medium-sized airports.

So the present invention has been demonstrated viable and affordable for smaller airports. Fundamentally, while the existing Low-Cost Surveillance Program (LCGS) is targeting a solution that is 2-3 times less expensive than Rannoch Corporation's ADS-X system, the present invention provides some key functionality of an LCGS system for significantly reduced cost.

DETAILED DESCRIPTION OF THE INVENTION

A need exists in the art to perform low-cost tagging for surface surveillance systems that have Surface Movement Radar and Data Fusion/ATC Displays. The technique of the present invention may be used as a discriminator for follow-on improvements to the FAA Low-Cost Ground Surveillance Program.

Figure 1:
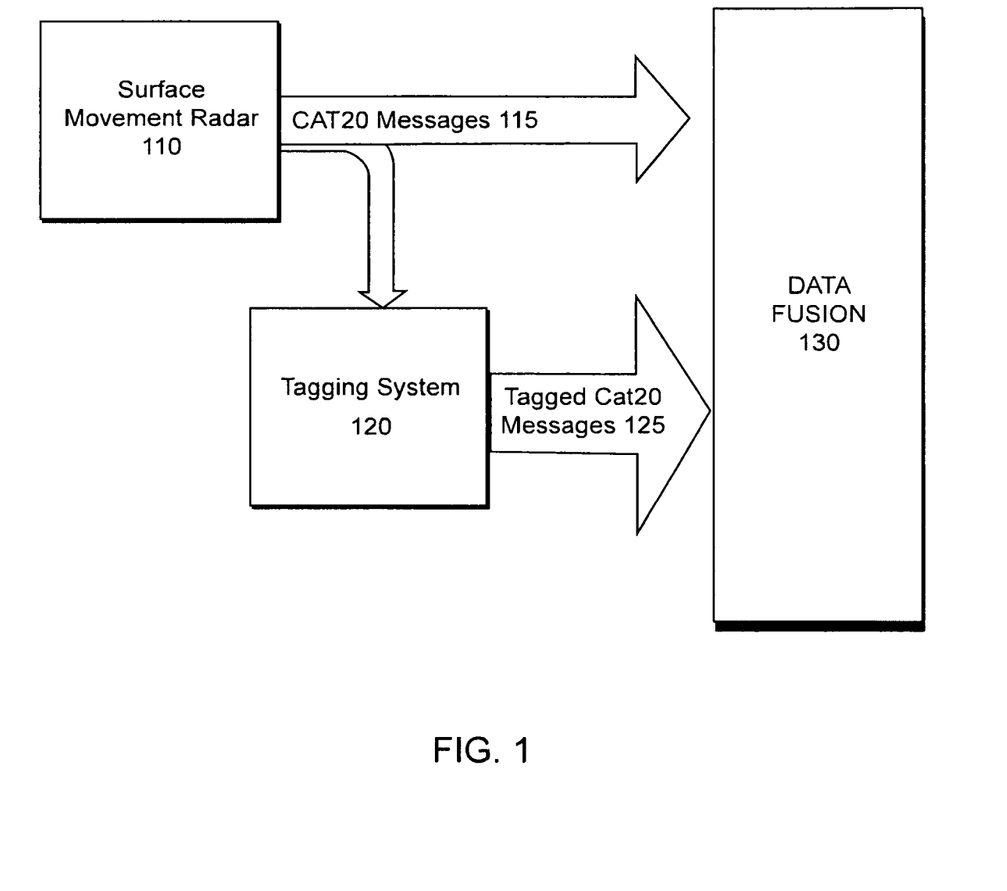
FIG. 1 is a block diagram of a first embodiment of the present invention.

FIG. 1 is a block diagram of a first embodiment of the present invention. Referring to FIG. 1, Surface Movement Radar (SMR) 110 may detect movement of aircraft on the ground using conventional radar techniques. SMR 110 outputs, for example, CAT20 messages 115 to data fusion block 130. CAT20 messages may comprise multilateration messages as described in the "Eurocontrol Standard Document for Surveillance Data Exchange, Part 14, Category 020" published April, 2008 and incorporated herein by reference. Other types of data messages may be used within the spirit and scope of the present invention. The use of CAT20 messages is by way of example only.

Referring again to FIG. 1, tagging system 120 also received the CAT20 messages 115 from SMR 110. Tagging system 120 then populates the ID field in the message payload portion of the CAT20 Messages 115 and provides the tagged messages CAT20 Messages 125 to the Data Fusion System 130. These tagged CAT20 messages 125 take the position data from the original CAT20 messages 115 and add identifying information as will be described in more detail below. Data fusion block 130 may comprise a Rannoch/ERA data fusion software package for combining different data types to output tracking and identification data for aircraft and ground vehicles. The data fusion system then uses the tagged CAT20 messages either standalone, or in conjunction with messages received directly from the SMR. Note that no Data Fusion modification may be required.

Figure 2:
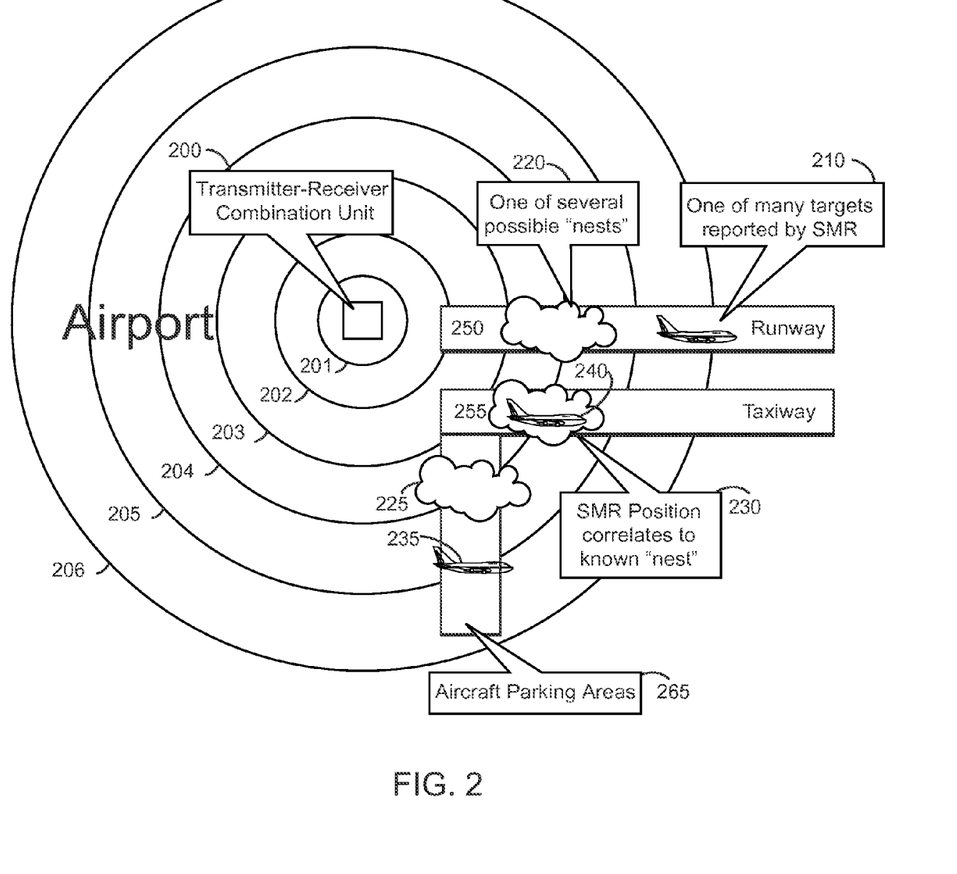
FIG. 2 is a diagram illustrating the operation of the present invention.

FIG. 2 is a diagram illustrating the operation of the present invention. The following describes a unilateration technique using a single co-located Transmitter/Receiver to automatically populate Transponder target IDs with no ADSB for Surface Movement Radar using round-trip TDOA. Referring to FIG. 2, the technique of the present invention is described as follows. A single co-located Transmitter-Receiver combination unit 200 can plot a given target position as one of an infinite number of possible points on one or more spheres using Interrogation Round-trip Time Difference of Arrival (TDOA_R), recognizing that these spheres contains a window of error of up to 25 ft in terms of radius relative to the transmitter. The spheres may be degenerated into a plurality of circles on the ground, as illustrated in FIG. 2 as circles 201-206, if the targets are filtered to include only those transmitting a zero-altitude position.

The embodiment of FIG. 2 illustrates only one embodiment of the present invention and should not be construed as limiting the present invention in any way. The use of a co-located transmitter and receiver 200 as illustrated in FIG. 2 has some advantages in ease of installation. However, the transmitter and receiver portions of transmitter/receiver 200 may be located separately without departing from the spirit and scope of the present invention. The receiver portion may or may not be co-located with the interrogator (transmitter) portion. When they are not co-located, the Line of Position may be represented by an ellipse, as opposed to the circle as illustrated in FIG. 21. A circle is a special case that falls out of the equation of the ellipse, where the transmitter and receiver are located together.

The use of elliptical surveillance is disclosed in parent patent application Ser. No. 11/429,926, (Evers et al.) filed on May 8, 2006, now U.S. Pat. No. 7,477,193, issued Jan. 13, 2009, entitled "Method and System for Elliptical-Based Surveillance," assigned to the same assignee as the present invention, and incorporated herein by reference. Evers discloses a system for performing elliptical-based and hybrid surveillance using one or more receiving and transmitting elements time synchronized to a common precision time reference. Antennas for transmitting and receiving elements are located at known positions separated from one another. At a given time, one of the transmitting elements transmits an interrogation signal to one or more targets, which respond to the interrogation with a reply transmission, received by one or more receiving elements. The central workstation calculates each target's ellipse of position with respect to each receiving element, using the interrogator element time of interrogation measurement and each receiving element's time of arrival measurement for the corresponding reply transmission, and then fuses the elliptical line of positions for each receiving element to compute target positions or augment passive surveillance position.

The domain of possible ground positions for a given target can be further reduced by only including targets whose potential TDOA_R falls only on one of the possible ground positions that may be physically occupied in the airport. For example, runways 250, taxiways 255 and aircraft parking areas 265. For purposes of the invention, it is presumed that the aircraft are not located off these standard areas. The above filtering technique reduces the number of possible positions for a given target down to only a handful in most airports.

These potential positions may be referred to as 'nests'. Thus, for example, in FIG. 2, circle 24 intersects three possible "nests", 225, 230, and 220. If a Mode A transponder signal is measured, using TDOA_R techniques from transmitter/receiver 200 places the signal somewhere on circle 204, then the corresponding aircraft or vehicle may be in one of three possible locations (225, 230, and 220) in this illustrated example.

Tagging system 120 of FIG. 1 then determines which of the nests are occupied with targets by correlating the nest positions with data feeding in from Surface Movement Radar. In the Examiner of FIG. 2, there are three targets, 210, 240, and 235. The SMR data from SMR 110 of FIG. 1 provides target positions without providing the target IDs. Once a target position indicates that a unique concentric nest is occupied, tagging system 120 of FIG. 1 populates the correct nest with the SMR target, thus associating the targets ID with it's SMR position. In this example, nest 230 corresponds with position of aircraft 240, and thus Mode A or other the identifying information from the transmitter/receiver 200 may be correlated to the position information of SMR data of aircraft 240.

Upon matching the identified SMR target to its nest, tagging system 120 of FIG. 1 then continues to track the target by not only using the above method, but also by using the newly determined association. The SMR target is identified only when a unique solution to the matching problem occurs. Thus, for example, if three aircraft occupy the three "nests" 220, 230, and 225 of FIG. 2, then unique identification may not be possible, at least momentarily. However, given the dynamic nature of the movement of both the nests and SMR targets, many unique matching opportunities are consistently expected in a relatively small time-frame. It should be noted that this system is inherently capable of recognizing outstanding velocity and acceleration (as would occur on the runway) as heuristics in determining target identification.

Implementation of the present invention is as follows. In theory, only a single well-positioned co-located Transmitter/Receiver unit 200 is required. However in practice, it is likely that two such units may be used for enhanced accuracy, coverage, cross-reference, and redundancy. It should be further noted that receiving data from two co-located R/T stations can serve as the first step towards a complete multilateration system and can yield a core set of add-on capabilities.

Given the low overhead and installation costs, leasing the system (by charging only for the tagged CAT20 data) becomes a viable option that greatly improves the ability to quickly capture market-share with limited investment.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A method of tagging vehicle identification data to vehicle surveillance data, comprising the steps of:
   receiving a vehicle position data from a vehicle tracking system;
   receiving vehicle identification data from a radio signal from the vehicle;
   correlating the vehicle identification data to the vehicle position data by:
      determining an ellipse of position of the vehicle based at least on travel time of the radio signal, and
      identifying the vehicle based on the ellipse of position of the vehicle and a database of possible vehicle locations; and
   outputting the vehicle position data tagged with the vehicle identification data.

2. The method of claim 1, wherein said step of receiving vehicle identification data from a radio signal from the vehicle comprises the steps of:
   generating an interrogation signal from a transmitter having a known location; and
   receiving at a receiver having a known location, a response signal from a vehicle transponder in response to the interrogation signal.

3. The method of claim 2, wherein the step of determining an ellipse of position of the vehicle based at least on travel time of the radio signal comprises the step of:
   measuring a time delay between the generation of the interrogation signal and receipt of the response signal to determine a round-trip transit time; and
   generating an ellipse of position representing a possible location of the vehicle at some point on the ellipse.

4. The method of claim 3, wherein the step of identifying the vehicle based on the ellipse of position of the vehicle and a database of possible vehicle locations comprises the steps of:
   retrieving, from the database, a map of potential vehicle position areas;
   superimposing the ellipse of position over the map to determine which potential vehicle positions areas correspond to a possible location of the vehicle; and
   determining vehicle position as a position where potential vehicle position and possible vehicle position coincide.

5. The method of claim 4, wherein the vehicle comprises one or more of an aircraft or an airport ground vehicle, and the map of potential vehicle position areas comprises a map of airport runways, taxiways, and parking areas.

6. The method of claim 4, wherein the transponder comprises a Mode S transponder.

7. The method of claim 2, wherein the known location of the transmitter and the known location of the receiver coincide and the ellipse of position of the vehicle comprises a circle.

8. The method of claim 1, wherein the vehicle comprises one or more of an aircraft or an airport ground vehicle and the vehicle tracking system comprises a Surface Movement Radar (SMR) outputting vehicle position data as a surveillance interface message.

9. The method of claim 8, wherein the step of outputting the vehicle position data tagged with the vehicle identification data comprises the steps of:
   receiving the surveillance interface message including vehicle position data
   inserting the vehicle identification data into an identification field of the surveillance interface message to produced a tagged surveillance interface message; and
   outputting the tagged surveillance interface message.

10. The method of claim 6, wherein the transponder outputs a Mode A identification data in response to interrogation by the transmitter.

11. A system for tagging vehicle identification data to vehicle surveillance data including vehicle position data from a vehicle tracking system, the system comprising:
   a data input for receiving vehicle position data from a vehicle tracking system;
   a radio for receiving vehicle identification data from a radio signal from the vehicle;
   a computer system for correlating the vehicle identification data to the vehicle position data by determining an ellipse of position of the vehicle based at least on travel time of the radio signal, and identifying the vehicle based on the ellipse of position of the vehicle and a database of possible vehicle locations; and
   a data output for outputting the vehicle position data tagged with the vehicle identification data.

12. The system of claim 11, wherein said radio for receiving vehicle identification data from a radio signal from the vehicle further comprises:
   a radio transmitter portion having a known location, for generating an interrogation signal; and
   a radio receiving portion having a known location, for receiving the response signal from a vehicle transponder.

13. The system of claim 12, wherein the computer system determines an ellipse of position of the vehicle based at least on travel time of the radio signal by measuring a time delay between the generation of the interrogation signal and receipt of the response signal to determine a round-trip transit time, and generating an ellipse of position representing a possible location of the vehicle at some point on the ellipse.

14. The system of claim 13, wherein the computer system identifies the vehicle based on the ellipse of position of the vehicle and a database of possible vehicle locations by retrieving, from the database, a map of potential vehicle position areas, superimposing the ellipse of position over the map to determine which potential vehicle positions areas correspond to a possible location of the vehicle, determining vehicle position as a position where potential vehicle position and possible vehicle position coincide.

15. The system of claim 14, wherein the vehicle comprises one or more of an aircraft or an airport ground vehicle, and the map of potential vehicle position areas comprises a map of airport runways, taxiways, and parking areas.

16. The system of claim 14, wherein the transponder comprises a Mode S transponder.

17. The system of claim 12, wherein the known location of the transmitter and the known location of the receiver coincide and the ellipse of position of the vehicle comprises a circle.

18. The system of claim 11, wherein the vehicle comprises one or more of an aircraft or an airport ground vehicle and the vehicle tracking system comprises a Surface Movement Radar (SMS) outputting vehicle position data as a surveillance interface message.

19. The system of claim 18, wherein the data output outputting the vehicle position data tagged with the vehicle identification data receives the surveillance interface message including vehicle position data, inserts the vehicle identification data into an identification field of the surveillance interface message to produced a tagged surveillance interface message, and outputs the tagged surveillance interface message.

20. The system of claim 16, wherein the transponder outputs a Mode A identification data in response to interrogation by the transmitter.

* * * * *